(12) United States Patent
Kawasaki

(10) Patent No.: US 8,622,870 B2
(45) Date of Patent: Jan. 7, 2014

(54) IN-VEHICLE POWER TRANSMISSION DEVICE AND DRIVING SYSTEM FOR VEHICLE

(75) Inventor: Koji Kawasaki, Anjo (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 972 days.

(21) Appl. No.: 12/591,155

(22) Filed: Nov. 10, 2009

(65) Prior Publication Data

US 2010/0120579 A1 May 13, 2010

(30) Foreign Application Priority Data

| Nov. 11, 2008 | (JP) | 2008-289166 |
| May 15, 2009 | (JP) | 2009-118577 |
| Oct. 21, 2009 | (JP) | 2009-242314 |

(51) Int. Cl.
*B60K 1/02* (2006.01)

(52) U.S. Cl.
USPC .............................................. 477/3

(58) Field of Classification Search
USPC .......... 477/3, 107, 110; 475/5, 207, 210, 211, 475/218, 219, 329, 330
See application file for complete search history.

(56) References Cited

U.S. PATENT DOCUMENTS

| 5,722,502 A | 3/1998 | Kubo |
| 5,766,105 A | 6/1998 | Fellows et al. |
| 6,732,526 B2 | 5/2004 | Minagawa et al. |
| 6,887,175 B2 | 5/2005 | Yamauchi et al. |
| 7,252,611 B2 * | 8/2007 | Raghavan et al. ................. 475/5 |
| 7,473,199 B2 * | 1/2009 | Bucknor et al. ................... 475/5 |
| 7,637,836 B2 * | 12/2009 | Watanabe et al. ............. 475/210 |
| 8,337,352 B2 * | 12/2012 | Morrow et al. ..................... 475/5 |
| 2004/0065520 A1 | 4/2004 | Murray |
| 2008/0236917 A1 | 10/2008 | Abe et al. |
| 2010/0063704 A1 * | 3/2010 | Okubo et al. ................... 701/99 |

FOREIGN PATENT DOCUMENTS

| JP | A-9-46821 | 2/1997 |
| JP | A-9-506417 | 6/1997 |
| JP | A-2000-142146 | 5/2000 |
| JP | A-2002-281607 | 9/2002 |

(Continued)

OTHER PUBLICATIONS

Oct. 16, 2012 Office Action issued in JP Application No. 2009-242314 (with English translation).

(Continued)

*Primary Examiner* — David D Le
*Assistant Examiner* — David J Hlavka
(74) *Attorney, Agent, or Firm* — Oliff & Berridge, PLC

(57) ABSTRACT

An in-vehicle power transmission apparatus is equipped with a plurality of power split rotors and a power transmission control mechanism. The power split rotors work to split power among a rotary electric machine such as a motor-generator, an internal combustion engine, and a driven wheel of the vehicle. If rotational energy, as outputted from the power split rotors, is defined as being positive in sign, the power split rotors are so assembled that when the power transmission control mechanism establishes transmission of the rotational energy that is positive in sign as the power from a first rotor that is one of the power split rotors to the internal combustion engine, the other power split rotors are so linked as to provide output rotational energies which are opposite in sign to each other. This enables the speed of the first rotor to be placed at substantially zero.

34 Claims, 24 Drawing Sheets

(56) References Cited

FOREIGN PATENT DOCUMENTS

| JP | A-2004-514103 | 5/2004 |
| JP | B2-3580257 | 10/2004 |
| JP | B2-3614409 | 1/2005 |
| JP | B2-3626151 | 3/2005 |
| JP | A-2006-77859 | 3/2006 |
| JP | A-2006-308039 | 11/2006 |
| JP | A-2008-247192 | 10/2008 |

OTHER PUBLICATIONS

Dec. 18, 2012 Office Action issued in Japanese Patent Application No. 2009-179547 (with translation).

* cited by examiner

FIG. 2(a)
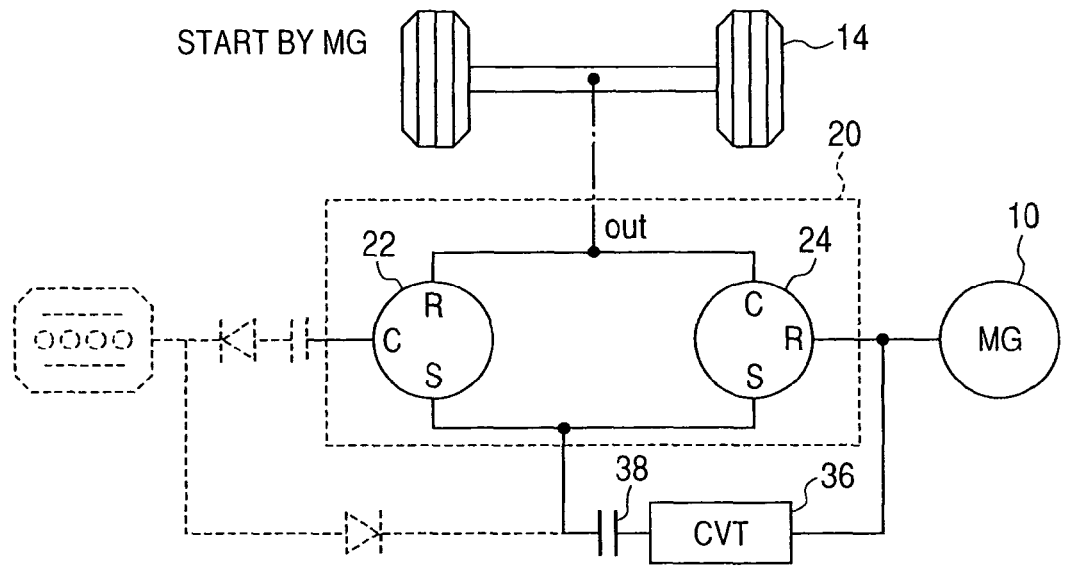
START BY MG
FIG. 2(b)
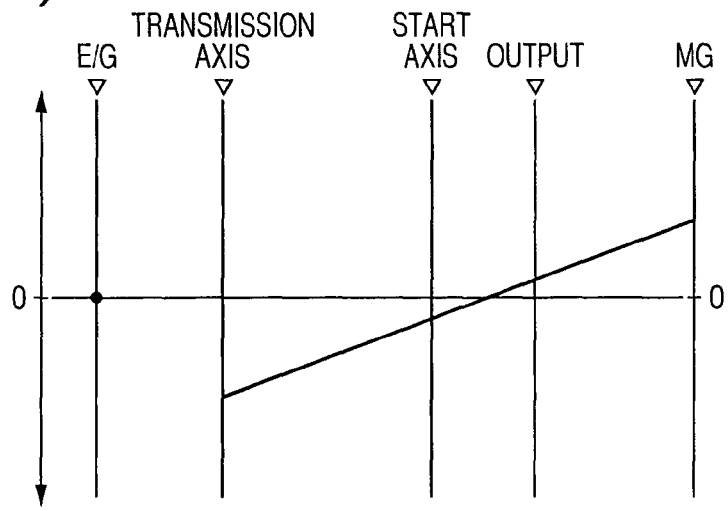
FIG. 2(c)
| ROTATIONAL DIRECTION | | | TORQUE | | | POWER | | |
|---|---|---|---|---|---|---|---|---|
| S | C | R | S | C | R | S | C | R |
| − | + | + | − | + | − | + | + | − |
| − | + | + | + | − | + | − | − | + |

FIG. 3(a)
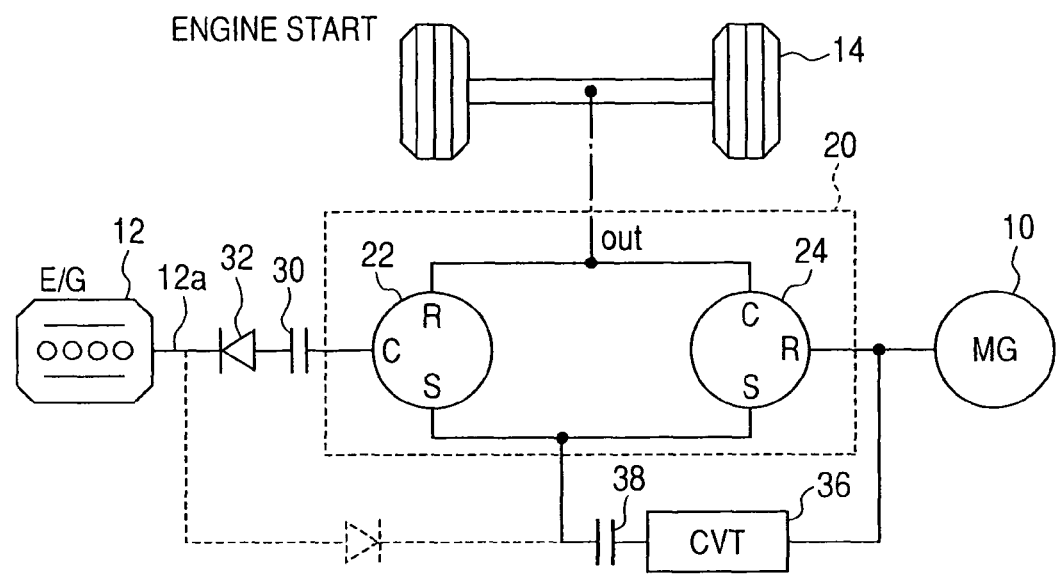
FIG. 3(b)
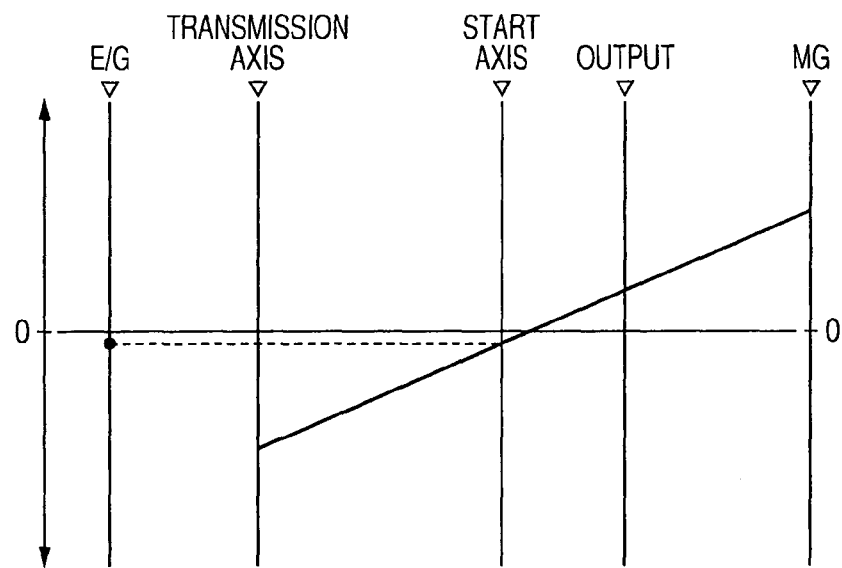
FIG. 3(c)
| ROTATIONAL DIRECTION | | | TORQUE | | | POWER | | |
|---|---|---|---|---|---|---|---|---|
| S | C | R | S | C | R | S | C | R |
| − | − | + | + | − | + | − | + | + |

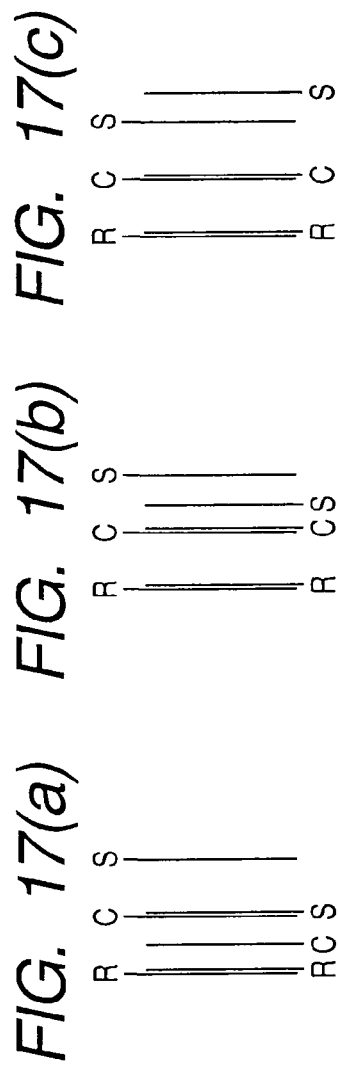
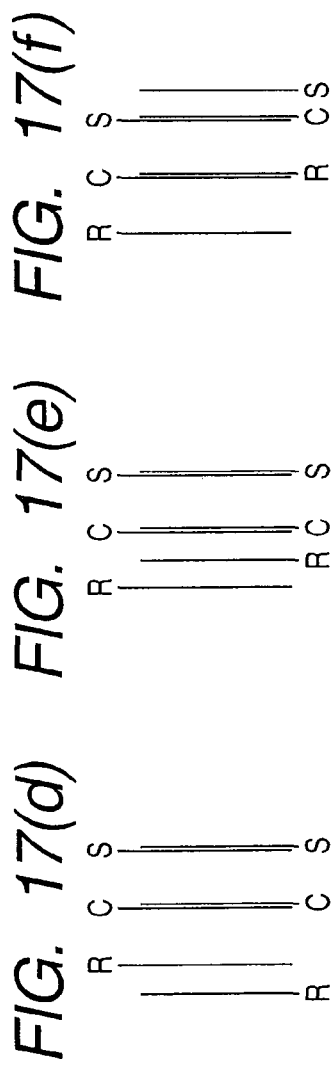
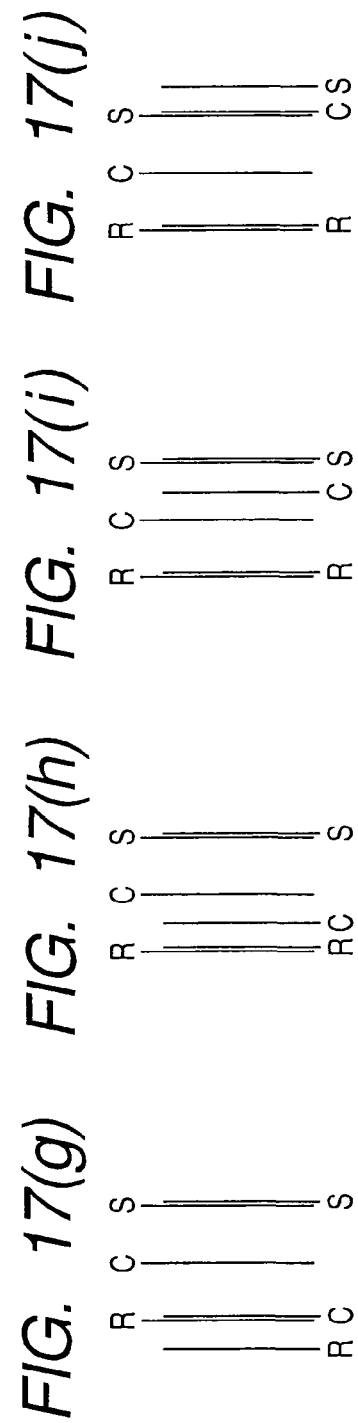

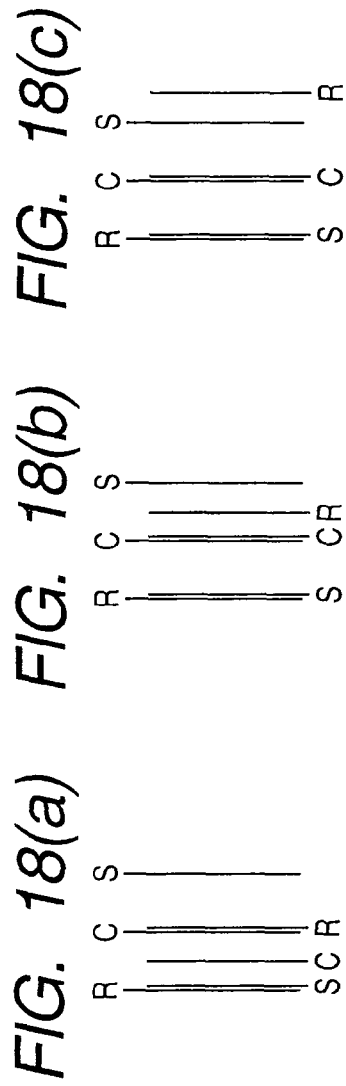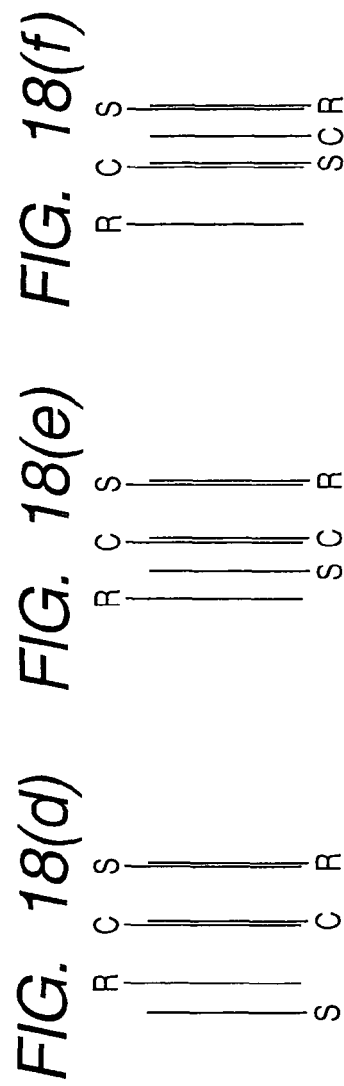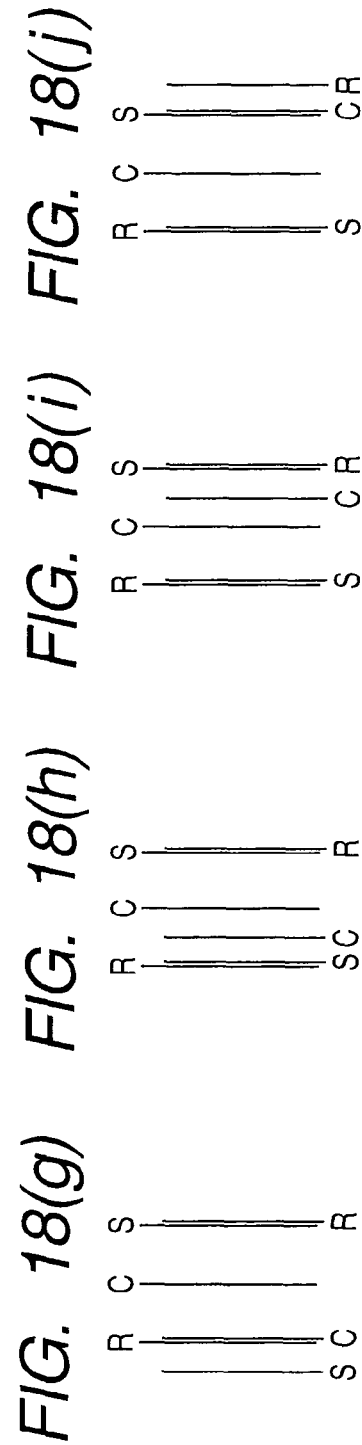

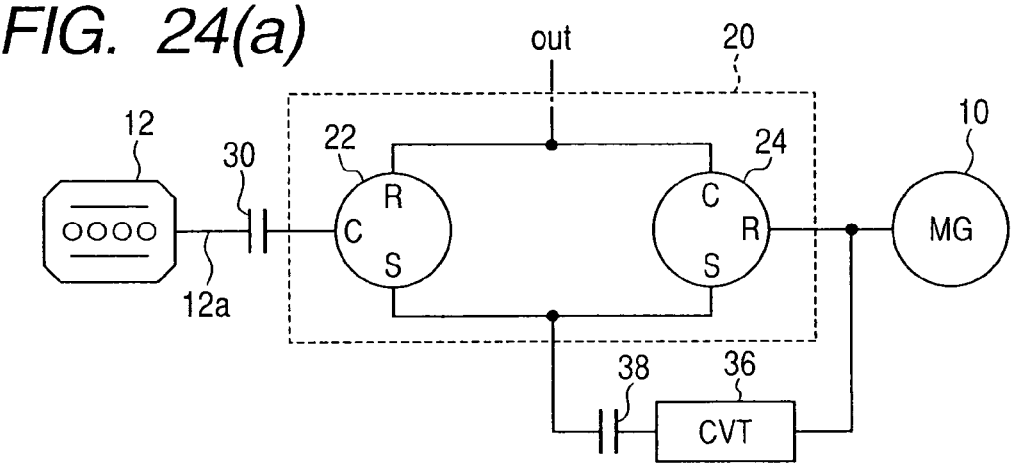
FIG. 24(a)
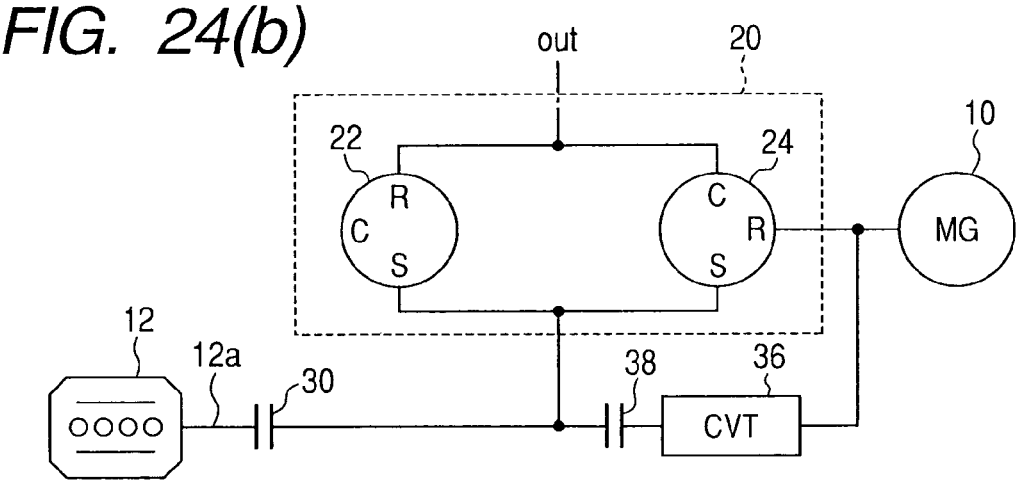
FIG. 24(b)
FIG. 25(a)
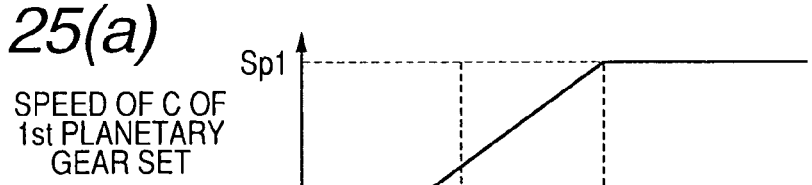
SPEED OF C OF 1st PLANETARY GEAR SET
FIG. 25(b)
CLUTCH 30
FIG. 25(c)
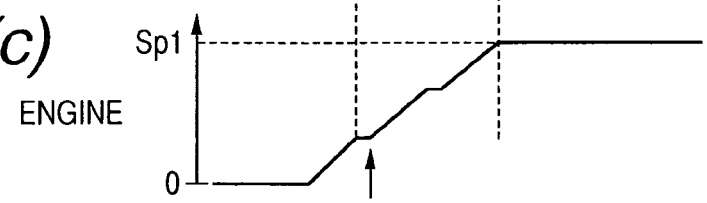
ENGINE

IN-VEHICLE POWER TRANSMISSION DEVICE AND DRIVING SYSTEM FOR VEHICLE

CROSS REFERENCE TO RELATED DOCUMENT

The present application claims the benefits of Japanese Patent Application Nos. 2008-289166 filed on Nov. 11, 2008, 2009-118577 filed on May 15, 2009, and 2009-242314 filed on Oct. 21, 2009, disclosures of which are incorporated herein by reference.

BACKGROUND OF THE INVENTION

1. Technical Field of the Invention

The present invention relates generally to an in-vehicle power transmission device equipped with a plurality of power split rotors which work to split output power or torque among a rotary electric machine (e.g., a dynamo-electric machine), an internal combustion engine, and driven-wheels of a vehicle and are designed to rotate in conjunction with each other and a driving system for vehicles.

2. Background Art

In recent years, in terms of reducing the amount of energy consumed by automotive vehicles, so-called hybrid vehicles have been put into practical use which are equipped with a rotary electric machine such as an in-vehicle power source made up of an electric motor and a generator in addition to an internal combustion engine. The hybrid vehicles are typically controlled to stop the internal combustion engine in a low speed running range in view of the fact that the internal combustion engine is usually inefficient in energy use in the low speed running range. The hybrid vehicles are facing a difficulty in how to restart the internal combustion engine during running of the vehicles. For example, it is difficult to bring a rotor which is coupled with driven wheels of the vehicle and now rotating into mechanical connection with the crankshaft of the internal combustion engine which is at a stop.

In order to avoid the above problem, there have been in practice use hybrid vehicles equipped with the electric motor whose output shaft is connected directly to the crankshaft of the internal combustion engine to transmit the torque, as outputted from the electric motor, to the crankshaft of the engine to start it. After start-up of the engine, the torque, as produced by the engine, is transmitted to the driven wheels of the vehicle.

Additionally, there have been in practical use hybrid vehicles equipped with a typical planetary gear speed reducer (also called an epicycle reduction gear train) made up of three rotors: a sun gear, a carrier (also called a planetary carrier), and a ring gear to which the generator, the internal combustion engine, and the electric motor are coupled, respectively. The driven wheels of the vehicle are coupled mechanically to the electric motor. In operation, the torque is applied to the sun gear or the ring gear to rotate the carrier, thereby rotating the rotating shaft (i.e., the crankshaft) of the internal combustion engine. The internal combustion engine is started by using the torque of the carrier. After the start-up of the internal combustion engine, the engine torque is transmitted to the driven wheels of the vehicle through the carrier.

For example, typical hybrid vehicles are known in the following patent publications.
Japanese Patent Publication No. 3580257
Japanese Patent Publication No. 3626151
Japanese Patent Publication No. 3614409
Japanese Patent First Publication No. 2002-281607
Japanese Patent First Publication No. 2000-142146
Japanese Patent First Publication No. 9-46821
Japanese Patent First Publication No. 2006-77859

The direct coupling of the rotating shaft of the electric motor to that of the internal combustion engine, as described above, will cause the torque load, as produced by the internal combustion engine, to be exerted on the electric motor, thus resulting in an increase in consumed amount of energy. A problem is also encountered that when the internal combustion engine is started, the pulsation of torque occurring at the rotating shaft of the internal combustion engine may result in a decrease in driveability of the vehicle.

Further, the use of the planetary gear speed reducer leads to the problem that starting of the internal combustion engine when the rotational speed of the carrier is low will cause the internal combustion engine to be kept run at low speeds for a while. This is against the intended purpose of the hybrid vehicles to run the internal combustion engine in a speed range in which the efficiency in energy use is high.

SUMMARY OF THE INVENTION

It is, therefore, a principal object of the invention to avoid the disadvantages of the prior art.

It is another object of the invention to provide a power transmission apparatus for a vehicle designed to start an internal combustion engine effectively.

According to one aspect of the invention, there is provided a power transmission apparatus for a vehicle equipped with a rotary electric machine, an internal combustion engine, and at least one driven wheel. The power transmission apparatus comprises: (a) a plurality of power split rotors which work to rotate in conjunction with each other to split power among a rotary electric machine, an internal combustion engine, and a driven wheel of a vehicle; and (b) a power transmission control mechanism working to selectively establish and block transmission of the power between a first rotor that is one of the power split rotors and the internal combustion engine. If rotational energy, as outputted from the power split rotors, is defined as being positive in sign, the power split rotors are so disposed that when the power transmission control mechanism establishes transmission of the rotational energy that is positive in sign as the power from the first rotor to the internal combustion engine, ones of the power split rotors other than the first rotor are so linked as to provide output rotational energies which are different in sign from each other.

Specifically, when the power transmission control mechanism establishes the transmission of the rotational energy from the first rotor to the internal combustion engine, ones of the power split rotors other than the first rotor are to produce output rotational energies which are opposite in sign to each other. This enables the first rotor to be placed at an extremely low speed or a speed of zero (0) or the rotational energy outputted from the first rotor to be decreased to an extremely low level. Therefore, when the internal combustion engine is at a stop, but the vehicle is being run by the power of the rotary electric machine such as a motor-generator, the power transmission apparatus is capable of bringing the rotational speed of the first rotor substantially into agreement with a zero (0) speed of the internal combustion engine and then applying initial torque, as provided by the rotational energy outputted from the first rotor, to the internal combustion engine for starting it. This minimizes the vibration of the power transmission control mechanism which will arise from the application of the initial torque. After the application of initial torque from the first rotor to the internal combustion engine, in other words, the internal combustion engine has been started up, the power transmission apparatus may work to input torque, as produced by the internal combustion engine, into one or some of the power split rotors (e.g., the first rotor or other power split rotors) to drive the vehicle.

In the preferred mode of the invention, the ones of the power split rotors which produce the rotational energies different in sign from each other are coupled mechanically with each other through a path bypassing an assembly of the power split rotors. Specifically, this realizes the ones of the power split rotors which produce the rotational energies different in sign from each other without need for two rotary electric machines (e.g., motor-generators) one of which supplies the output rotational energy and other of which receives it.

Rotors that are ones of the power split rotors and the first rotor are so linked as to have rotational speeds arrayed on a straight line in a monographic chart. The power transmission apparatus further includes a coupling mechanism which couples two of the rotors together mechanically outside the assembly of the power split rotors. The coupling mechanism works as a speed variator having a variable gear ratio (also called an input-to-output speed ratio). Specifically, an inclination of the straight line in the monographic chart is changed by controlling the gear ratio of the speed variator. Therefore, the speed of the first rotor may be controlled by changing the gear ratio regardless of the speed of the driven wheel.

The power transmission control mechanism works as a first power transmission control mechanism to selectively establish and block transmission of the power between the first rotor and a rotating shaft of the internal combustion engine. The power transmission apparatus further includes a second power transmission control mechanism working to selectively establish and block transmission of the power between a second rotor that is one of the power split rotors and the internal combustion engine. This structure enables the initial torque to be applied to the rotating shaft of the internal combustion engine from the first rotor and also the torque, as produced by the internal combustion engine, to be applied to the second rotor. Specifically, the engine may be started by the torque outputted from the power split rotor, thus eliminating the need for a separate engine starter. Further, the transmission of power between the first and second rotors and the engine may be blocked and established selectively, thus minimizing the amount of energy consumed by the application of torque to the engine when being at a stop and enabling the transmission of torque between the first and second rotors and the engine as a function of differences in speed between the rotating shaft of the engine and the first and second rotors.

The first power transmission control mechanism is equipped with a one-way power transmission mechanism which establishes the transmission of the power when rotational speed of an input side of the one-way power transmission mechanism which connects with the first rotor relative to that of an output side thereof which connects with the rotating shaft of the internal combustion engine is not a negative value. When the fuel has started to be burned in the engine after being started, the torque on the rotating shaft will arise, so that the speed thereof increases quickly. The transmission of such a variation in torque to the first rotor may result in pulsation of torque in the power transmission apparatus. However, when the speed of the engine is increased above the input side of the one-way clutch connecting with the first rotor, the transmission of the variation in torque is blocked to the first rotor, thus avoiding the pulsation of torque in the power transmission apparatus (i.e., a body of the vehicle).

The first power transmission control mechanism may also be equipped with an electronically controlled breaker which is separate from the one-way power transmission mechanism. The electronically controlled breaker works to block the transmission of power between the first rotor and the rotating shaft of the internal combustion engine. This enables avoids the transmission of power from the first rotor to the internal combustion engine before it required to start the internal combustion engine, thus minimizing the amount of energy to be consumed by application of power to the rotating shaft of the engine.

The second power transmission control mechanism may be equipped with a one-way power transmission mechanism which establishes the transmission of the power when rotational speed of an input side of the one-way power transmission mechanism which connects with the rotating shaft of the internal combustion engine relative to that of an output side thereof which connects with the second rotor is not a negative value. When the rotating shaft of the engine is required to be joined mechanically to the second rotor to add the torque of the engine to the second rotor, it is preferable to bring the speed of the rotating shaft of the engine and that of the second rotor into agreement with each other. This, however, requires fine control of such speeds. The one-way power transmission mechanism works to apply the torque of the engine to the second rotor when the speed of the rotating shaft of the engine becomes equal to that of the second rotor, thus eliminating the need for the fine control of the speeds of the rotating shaft of the engine and the second rotor.

One of the power split rotors is coupled mechanically to the rotary electric machine. The power split rotors are so linked that rotational speed of the first rotor depends directly upon rotational speed of the one of the power split rotors coupled to the rotary electric machine. This enables the speed of the first rotor to be controlled by the speed of the rotary electric machine.

One of the power split rotors is coupled mechanically to the rotary electric machine. The power split rotors are so linked that rotational speeds of ones of the power split rotors other than the one coupled to the rotary electric machine depend directly upon rotational speed of the one coupled to the rotary electric machine and rotational speed of the second rotor. This enables the speeds of the ones of the power split rotors to be controlled by the that of the rotary electric machine or the engine.

The first rotor and the second rotor may be implemented by one of the power split rotors. The first power transmission control mechanism is separate from the second power transmission control mechanism. Further, the first power transmission control mechanism and the second power transmission control mechanism may be implemented by an electronically controlled breaker working to break the transmission of power between the first rotor and the rotating shaft of the internal combustion engine. Additionally, the first rotor is preferable so that the speed of the first rotor may be controlled to zero (0) when the one of the power split rotors connected mechanically to the driven wheel is not zero in speed. When it is required to apply the initial torque from the first rotor to the internal combustion engine, the electronically controlled breaker desirably work to connect the first rotor to the rotating shaft of the engine mechanically, block the connection of the first rotor and the engine after the initial torque is applied and before the burning of fuel in the engine is controlled, and connect the first rotor and the engine mechanically when a difference between the first rotor and the engine is below a given value after start of the burning control of fuel in the engine.

The first rotor is separate from the second rotor. This enables the torque to be applied from the first rotor to the rotating shaft of the engine and also the torque to be applied from the engine to the second rotor. The transmission of torque between the first and second rotors and the engine may be established or blocked selectively, thus enabling the engine to be started when the speed of the first rotor is the speed suitable for starting the engine. After the engine is started up, the torque, as produced by the engine, may be transmitted to the driven wheel through the second rotor. This enables the engine torque to be used while the engine is running at a speed different from that of the first rotor. It is, therefore, possible to start the engine at the time when the engine may be brought into an effective speed range early.

The power split rotors are so linked that rotational speed of the first rotor is lower than that of the second rotor. This enables the first rotor to be used to start the engine and the second rotor to be used to apply the engine torque to the driven wheel, thereby allowing the engine to continue to be run at a speed higher than that at which the engine has been started to transmit the engine torque to the driven wheel. It is, therefore, possible to start the engine so as to bring the speed thereof to an effective speed range early.

The power split rotors may be implemented by three or more rotors which are so linked that rotational speeds thereof are arrayed on a straight line in a monographic chart. The first rotor is one of the three or more rotors which lies at middle in rotational speed in the monographic chart. This facilitates ease of bringing the first rotor to a relatively low speed, thus enabling a difference in speed between the first rotor and the rotating shaft of the engine to be decreased when the engine is started.

The power split rotors may be implemented by three or more rotors which are so linked that rotational speeds thereof are arrayed on a straight line in a monographic chart. Two of the three or more rotors which are different in rotational speed in the monographic chart are coupled mechanically to the rotary electric machine.

At least one of the two of the three or more rotors is coupled to the rotary electric machine through a speed variator having a variable gear ratio. This structure enables the two of the rotors which are different in rotational speed in the monographic chart to be controlled in speed independently from each other, like in the case where two rotary electric machines are coupled mechanically to the two of the rotors. Additionally, in the case of use of such two rotary electric machines, this structure may also eliminate the loss of electric energy, as produced by one of the rotary electric machines which is operating as a generator, when the electric energy is supplied to the other rotary electric machine operating as an electric motor.

One of the power split rotors coupled mechanically to the driven wheel may have rotational speed in the monographic chart which lies intermediate between rotational speeds of the two of the three or more rotors which are coupled mechanically to the rotary electric machine. Additionally, the power split rotors may be implemented by four rotors (e.g., a Ravineaux planetary gear set) which are so linked that rotational speeds thereof are arrayed on a straight line in a monographic chart. One of the four rotors which lies at middle in rotational speed in the monographic chart and is separate from the first rotor may be coupled mechanically to the driven wheel. Specifically, the driven wheel is connected to the rotor which has to have the middle speed in the monographic chart, thereby facilitating ease of rotating the driven wheel in a normal or a reverse direction or stopping it. The rotor coupled to the driven wheel is separate from the first rotor, thereby permitting the speed of the first rotor to be determined independently from the speed of the driven wheel.

The power transmission apparatus may further comprise a first planetary gear set and a second planetary gear set each of which is equipped with a sun gear, a carrier, and a ring gear that are three of the power split rotors. Two of the power split rotors of the first planetary gear set are coupled mechanically to two of the power split rotors of the second planetary gear set. Of four of a total of the six power split rotors of the first and second planetary gear sets which are different in rotational speed in a monographic chart, at least three are coupled mechanically to the rotary electric machine, the internal combustion engine, and the driven wheel, respectively. Specifically, the four of the six power split rotors are so linked as to have rotational speeds arrayed on a straight line in the monographic chart, thus specifying the speeds of the rotary electric machine, the internal combustion engine, and the driven wheel.

The power transmission apparatus may further comprise a switch working to switch one of the power split rotors coupled mechanically to the driven wheel to another.

The adjustment of the speed of the driven wheel to a desired value results in addition of a limitation to the speeds of the power split rotors, which will result in addition of a limitation to the speed of the rotary electric machine or the internal combustion engine. Such speed adjustment may be a factor contributing to obstruction to the running of the rotary electric machine or the internal combustion engine in an effective speed range. In contrast, the structure of this invention alleviates the limitation to the speeds of the rotary electric machine or the internal combustion engine when it is required to bring the driven wheel to a desired speed, thereby enabling the rotary electric machine or the internal combustion engine to run in the effective speed range.

The vehicle may be an automotive vehicle with two driven wheels. The power transmission apparatus may further comprise a switch working to switch ones of the power split rotors coupled mechanically to the driven wheels of the vehicle to others. The ones and the others of the power split rotors to be coupled to the driven wheels include the second rotor and one of the power split rotors other than the first rotor, respectively.

The second rotor is coupled mechanically to the driven wheels through the second power transmission control mechanism. This structure prohibits the power from being transmitted from the internal combustion engine to the second rotor through the second power transmission control mechanism and enables the speed of the internal combustion engine to be adjusted to the speed of the driven wheels when the torque is being transmitted from the internal combustion engine to the second rotor. At this time, the torque may continue to be applied from the power split rotors to the driven wheels. Afterwards, the driven wheels may be connected mechanically to the second rotor through the second power transmission control mechanism, thereby enabling the driven wheels to be connected to the rotating shaft of the engine when they are rotating at the same speed. This minimizes the time for which the supply of torque to the driven wheels is being cut during the operation of the switch.

According to the second aspect of the invention, there is provided a power transmission apparatus for a vehicle which comprises: (a) a plurality of power split rotors which work to rotate in conjunction with each other to split power among a rotary electric machine, an internal combustion engine, and a driven wheel of a vehicle; (b) a first power transmission control mechanism working to selectively establish and block transmission of the power between a first rotor that is one of the power split rotors and a rotating shaft of the internal combustion engine; and (c) a second power transmission control mechanism working to selectively establish and block transmission of the power between a second rotor that is one of the power split rotors and the rotating shaft of the internal combustion engine.

Specifically, the engine may be started by the torque outputted from the power split rotor, thus eliminating the need for a separate engine starter. Further, the transmission of power between the first and second rotors and the engine may be blocked and established selectively, thus minimizing the amount of energy consumed by the application of torque to the engine when being at a stop and enabling the transmission of torque between the first and second rotors and the engine as a function of differences in speed between the rotating shaft of the engine and the first and second rotors.

In the preferred mode of the invention, the first power transmission control mechanism may be equipped with a one-way power transmission mechanism which establishes the transmission of the power when rotational speed of an input side of the one-way power transmission mechanism which connects with the first rotor relative to that of an output side thereof which connects with the rotating shaft of the internal combustion engine is not a negative value.

The first power transmission control mechanism may also be equipped with an electronically controlled breaker which is separate from the one-way power transmission mechanism. The electronically controlled breaker works to block the transmission of power between the first rotor and the rotating shaft of the internal combustion engine.

The second power transmission control mechanism may be equipped with a one-way power transmission mechanism which establishes the transmission of the power when rotational speed of an input side of the one-way power transmission mechanism which connects with the rotating shaft of the internal combustion engine relative to that of an output side thereof which connects with the second rotor is not a negative value.

One of the power split rotors may be coupled mechanically to the rotary electric machine. The power split rotors may be so linked that rotational speed of the first rotor depends directly upon rotational speed of the one of the power split rotors coupled to the rotary electric machine.

One of the power split rotors may be coupled mechanically to the rotary electric machine. The power split rotors may be so linked that rotational speeds of ones of the power split rotors other than the one coupled to the rotary electric machine depend directly upon rotational speed of the one coupled to the rotary electric machine and rotational speed of the second rotor.

The first rotor and the second rotor may be implemented by one of the power split rotors. The first power transmission control mechanism may be separate from the second power transmission control mechanism.

The first rotor may be separate from the second rotor.

The power split rotors may be so linked that rotational speed of the first rotor is lower than that of the second rotor.

The power split rotors may be implemented by three or more rotors which are so linked that rotational speeds thereof are arrayed on a straight line in a monographic chart. The first rotor may be one of the three or more rotors which lies at middle in rotational speed in the monographic chart.

The power split rotors may be implemented by three or more rotors which are so linked that rotational speeds thereof are arrayed on a straight line in a monographic chart. Two of the three or more rotors which are different in rotational speed in the monographic chart may be coupled mechanically to the rotary electric machine.

At least one of the two of the three or more rotors may be coupled to the rotary electric machine through a speed variator having a variable gear ratio.

One of the power split rotors coupled mechanically to the driven wheel may have rotational speed in the monographic chart which lies intermediate between rotational speeds of the two of the three or more rotors which are coupled mechanically to the rotary electric machine.

The power split rotors may be implemented by four rotors which are so linked that rotational speeds thereof are arrayed on a straight line in a monographic chart. Ones of the four rotors which lie at middle in rotational speed in the monographic chart and may be separate from the first rotor are coupled mechanically to the driven wheel.

The power transmission apparatus may further comprise a first planetary gear set and a second planetary gear set each of which is equipped with a sun gear, a carrier, and a ring gear that are three of the power split rotors, two of the power split rotors of the first planetary gear set being coupled mechanically to two of the power split rotors of the second planetary gear set. Of four of a total of the six power split rotors of the first and second planetary gear sets which are different in rotational speed in a monographic chart, at least three may be coupled mechanically to the rotary electric machine, the internal combustion engine, and the driven wheel, respectively.

The power transmission apparatus may further comprise a switch working to switch one of the power split rotors coupled mechanically to the driven wheel to another.

The vehicle may be an automotive vehicle with two driven wheels. The power transmission apparatus may further comprise a switch working to switch ones of the power split rotors coupled mechanically to the driven wheels of the vehicle to others. The ones and the others of the power split rotors to be coupled to the driven wheels include the second rotor and one of the power split rotors other than the first rotor, respectively.

According to the third aspect of the invention, there is provided a driving system for a vehicle which comprises a power transmission apparatus and a controller. The power transmission apparatus includes (a) a plurality of power split rotors which work to rotate in conjunction with each other to split power among the rotary electric machine, an internal combustion engine installed in a vehicle, and a driven wheel of the vehicle, and (b) a power transmission control mechanism which works to selectively establish and block transmission of the power between a first rotor that is one of the power split rotors and the internal combustion engine. If rotational energy, as outputted from the power split rotors, is defined as being positive in sign, the power split rotors are so disposed that when the power transmission control mechanism establishes transmission of the rotational energy that is positive in to sign as the power from the first rotor to the internal combustion engine, ones of the power split rotors other than the first rotor are so linked as to provide output rotational energies which are opposite in sign to each other. The controller works to control an operation of the power transmission apparatus. When it is required to start the internal combustion engine, and rotational speed of the internal combustion engine is lower than a given value, the controller controls the power transmission control mechanism to establish the transmission of the rotational energy which is positive in sign from the first rotor to the internal combustion engine.

According to the fourth aspect of the invention, there is provided a driving system for a vehicle which comprises a power transmission apparatus including; and a controller. The power transmission apparatus includes (a) a plurality of power split rotors which work to rotate in conjunction with each other to split power among a rotary electric machine, an internal combustion engine installed in a vehicle, and a driven wheel of the vehicle, (b) a first power transmission control mechanism working to selectively establish and block transmission of the power between a first rotor that is one of the power split rotors and a rotating shaft of the internal combustion engine, and (c) a second power transmission control mechanism working to selectively establish and block transmission of the power between a second rotor that is one of the power split rotors and the rotating shaft of the internal combustion engine. The controller works to control an operation of the power transmission apparatus. When it is required to start the internal combustion engine, and rotational speed of the internal combustion engine is lower than a given value, the controller controls the first power transmission control mechanism to establish the transmission of the rotational energy which is positive in sign from the first rotor to the rotating shaft of the internal combustion engine.

The power transmission apparatus of each of the above driving systems may also be designed to have the structure, as discussed above.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(a) is a schematic block diagram which shows a power transmission path when a vehicle is started by a motor-generator;

FIG. 2(b) is a monographic chart which represents an operation of a power split device of the power transmission device of FIG. 1 along with the speed of an internal combustion engine;

FIG. 2(c) is a table which lists a relation in sign of rotational direction, torque, and power among a sun gear, a carrier, and a ring gear of the power split device of FIGS. 2(a) and 2(b);

FIG. 3(a) is a schematic block diagram which shows a power transmission path when an internal combustion engine is started by a power split device of FIG. 1(a);

FIG. 3(b) is a monographic chart which represents an operation of a power split device along with the speed of an internal combustion engine;

FIG. 3(c) is a table which lists a relation in sign of rotational direction, torque, and power among a sun gear, a carrier, and a ring gear of the power split device of FIGS. 3(a) and 3(b);

FIGS. 17(a) to 17(j) are monographic charts which represent modified structures of a power split device of the invention;

FIG. 18(a) to FIG. 18(j) are monographic charts which represent modified structures of a power split device of the invention;

FIGS. 24(a) and 24(b) are block diagrams which illustrate modifications of the power transmission device of the first embodiment; and FIGS. 25(a), 25(b), and 25(c) are time charts which demonstrate operations of the power transmission device of FIG. 24(a).

DESCRIPTION OF THE PREFERRED EMBODIMENTS

Figure 1A:
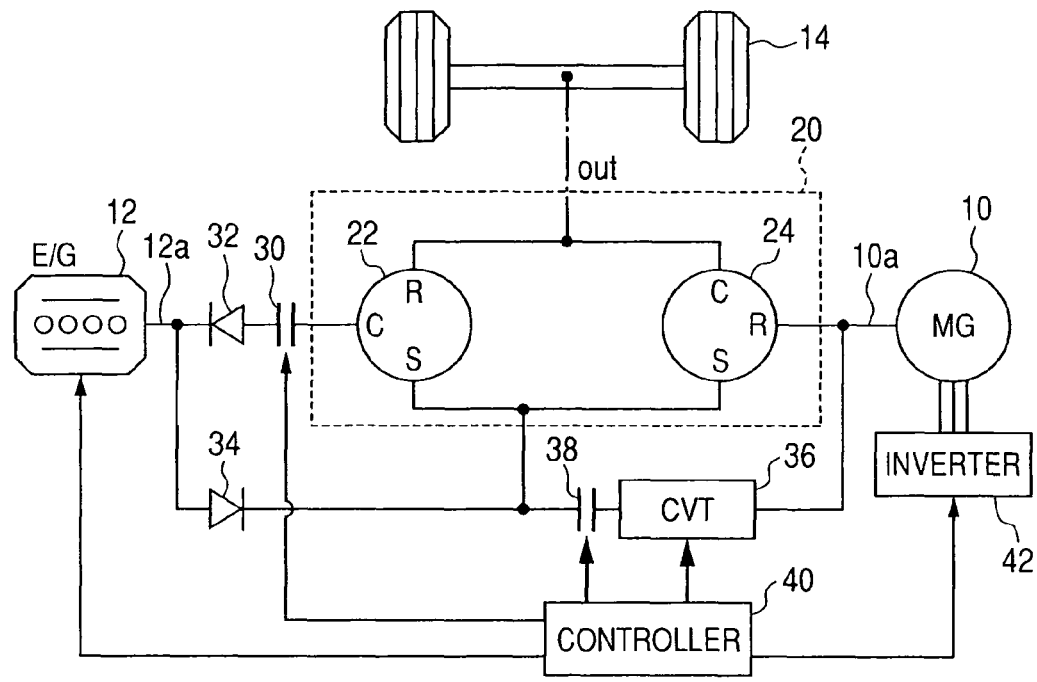
FIG. 1(a) is a block diagram which illustrates a hybrid system for a vehicle in which a power transmission device and a driving system according to the first embodiment of the invention are installed.
Figure 1B:
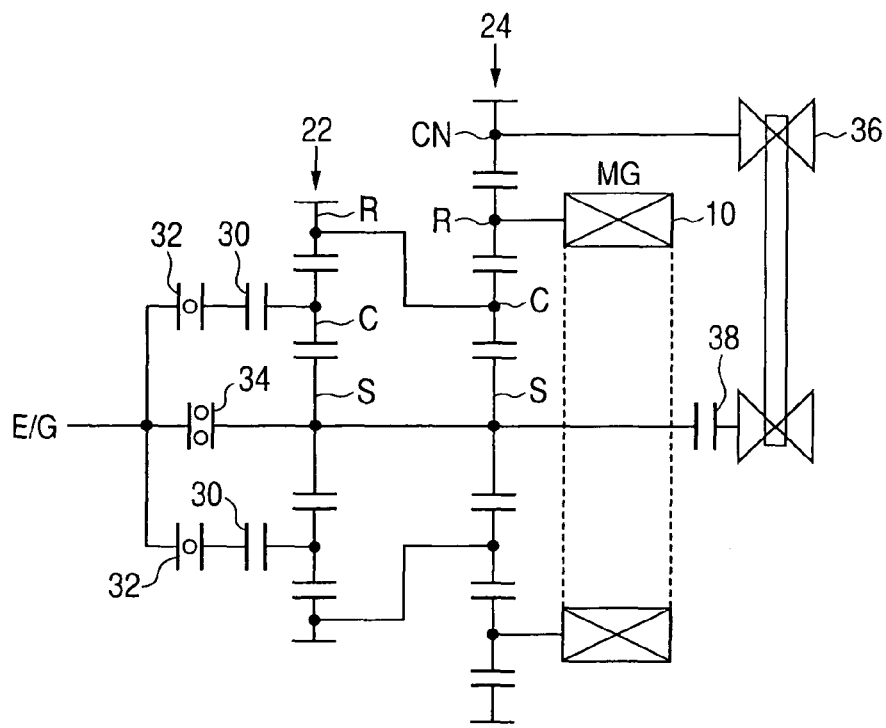
FIG. 1(b) is a skeleton view of power transmission paths of the power transmission device of FIG. 1(a)

Referring to the drawings, wherein like reference numbers refer to like parts in several views, particularly to FIGS. 1(a) and 1(b), there is shown a hybrid system made up of an in-vehicle power transmission device and a driving system according to the first embodiment of the invention. The in-vehicle power transmission device of this invention may alternatively be used with either an electric vehicle (EV) equipped only with an electric motor as a power source for running a road wheel or an automotive vehicle equipped only with an internal combustion engine as a power source for running a road wheel. The driving system is equipped with the in-vehicle power transmission device and a controller working to control an operation of the power transmission device. The driving system may also have installed therein a power source such as a motor-generator, an electric motor, or an internal combustion engine.

FIG. 1(a) illustrates the structure of the hybrid system. FIG. 1(b) is a skeleton view of power transmission paths.

The hybrid system includes a motor-generator 10 and a power split device 20. The motor-generator 10 is made of a three-phase ac motor-generator and works as an in-vehicle power producing device along with an internal combustion engine 12. The power split device 20 works to split power or torque among the motor-generator 10, the internal combustion engine (e.g., a gasoline engine) 12, and driven wheels 14 of an automotive vehicle.

The power split device 20 includes a first planetary gear set 22 and a second planetary gear set 24. The first planetary gear set 22 has a ring gear R joined mechanically to a carrier C of the second planetary gear set 24 and also has a sun gear S joined mechanically to a sun gear S of the second planetary gear set 24. To the ring gear R of the second planetary gear set 24, an output axis (i.e. a rotating shaft) 10a of the motor-generator 10 is coupled mechanically. The driven wheels 14 of the vehicle are joined mechanically to the ring gear R of the first planetary gear set 22 and the carrier C of the second planetary gear set 24. Specifically, the ring gear R of the first planetary gear set 22 and the carrier C of the second planetary gear set 24 are coupled mechanically to the driven wheels 14 through a typical differential gear and a typical drive shaft. Note that rotors (which will also be referred to as power split rotors below) of the power split device 20, as referred to herein, are not limited to the sun gears S, the carriers C, and the ring gears R of the first and second planetary gear sets 22 and 24, but may additionally or only include rotating parts of the differential gear and/or the drive shaft.

The carrier C of the first planetary gear set 22 is connected mechanically to the crankshaft (i.e., a rotating shaft 12a) of the internal combustion engine 12 through a clutch 30 and a one-way bearing 32. The clutch 30 works as an electronically controlled mechanical breaker to block the transmission of power (torque) between the carrier C of the first planetary gear set 22 and the one-way bearing 32. In this embodiment, the clutch 30 is of a normally open type. The one-way bearing 32 works as a one-way transmission mechanism to permit the transmission of power (torque) from the clutch 30 to the engine 12 under the condition that the rotational speed of the clutch 30 is not lower than that of the rotating shaft 12a of the engine 12. In other words, when the clutch 20 is engaged, the one-way bearing 32 works to have the rotating shaft 12a of the engine 12 follow the rotation of the carrier C of the first planetary gear set 22 unless the speed of the rotating shaft 12a of the engine 12 is greater than that of the carrier C of the first planetary gear set 22.

A one-way bearing 34 is disposed between the sun gear S of the first planetary gear set 22 and the sun gear S of the second planetary gear set 24. Like the one-way bearing 32, the one-way bearing 34 works as a one-way transmission mechanism to permit the transmission of power (torque) from the engine 12 to the first and second planetary gear sets 22 and 24 under the condition that the speed of the rotating shaft 12a of the engine 12 is not lower than the speed of the sun gears S. In other words, the one-way bearing 34 works to have the sun gears S of the first and second planetary gear sets 22 and 24 follow the rotation of the rotating shaft 12a of the engine 12 unless the speed of the sun gears S is greater than that of the rotating shaft 12a.

The sun gears S of the first and second planetary gear sets 22 and 24 are coupled mechanically to a rotating shaft 10a of the motor-generator 10 through a clutch 38 and a continuously variable transmission (CVT) 36. The CVT 36 is, as can be seen from FIG. 1(b), joined mechanically to the ring gear R of the second planetary gear set 24 through a counter gear CN. In other words, the sun gears S of the first and second planetary gear sets 22 and 24 are so linked as to receive the torque from the motor-generator 10 without any rotating parts or rotors (i.e., the power split rotors) of the power split device 20 which engage the sun gears S. The number of teeth of the counter gear CN may be either identical with or different from that of the ring gear R of the second planetary gear set 24. The CVT 36, as used in this embodiment, is of a mechanical type using a metallic or rubber belt. The clutch 38 functions as an electronically controlled mechanical breaker to block or open the transmission of power between the CVT 36 and the sun gears S of the first and second planetary gear sets 22 and 24.

The hybrid system also includes a controller 40 to control an operation of the power transmission device. The controller 40 works to actuate the clutches 30 and 38 to control the operation of the power transmission device and determine a controlled variable of the engine 12. The controller 40 also works to control an operation of an inverter 42 to determine a controlled variable of the motor-generator 10.

A vehicle starting operation using the power transmission device and starting control of the engine 12 will be described below.

First, the vehicle starting operation using the motor-generator 10 will be discussed with reference to FIGS. 2(a) and 2(b). FIG. 2(a) illustrates a power transmission path when the vehicle is started. FIG. 2(b) is a monographic chart which represents the operation of the power split device 20 along with the speed of the engine 12. In the illustrated case, the clutch 30 is blocking the connection between the one-way bearing 32 and the carrier C of the first planetary gear set 22. The clutch 28 is connecting between the CVT 36 and the sun gears S of the first and second planetary gear sets 22 and 24.

In the example of FIG. 2(b), the engine 12 is at a stop. The speeds of the rotors of the first and second planetary gear sets 22 and 24 which constitute the power split device 20 depend upon the speed of the motor-generator 10 and the gear ratio (also called an input-to-output speed ratio, a variable speed ratio, a pulley ratio, or a CVT ratio) of the CVT 36. Specifically, in the monographic chart of FIG. 2(b), the speed of the sun gears S of the first and second planetary gear sets 22 and 24 (i.e., the speed of a transmission shaft or axis in FIG. 2(b)), the speed of the carrier C of the first planetary gear set 22 (i.e., the speed of a starting axis in FIG. 2(b)), the speed of the ring gear R of the first planetary gear set 22 and the carrier C of the second planetary gear set 24 (i.e., the speed of output in FIG. 2(b)), and the ring gear R of the second planetary gear set 24 (i.e., the speed of the MG 10) lie on a diagonal straight line. The speeds of the rotors of the power split device 20 other than the sun gears S of the first and second planetary gear sets 22 and 24 and the ring gear R of the second planetary gear set 24 are, therefore, set by determining the speeds of the sun gears S and the ring gear R of the second planetary gear set 24. The sun gears S, the carriers C, and the ring gears R of the first and second planetary gear sets 22 and 24 rotate in conjunction with each other. For instance, the speed of the carriers C may be zero (0) depending upon the speeds of the sun gears S and the ring gears R.

The structure of the power transmission device of this embodiment is designed to enable the motor-generator 10 to produce a higher degree of torque when starting the vehicle without need for increasing the size of the motor-generator 10. This is for the following reasons.

If, in the second planetary gear set 24, a ratio of the number Zs of teeth of the sun gear S to the number Zr of teeth of the ring gear R (i.e., Zs/Zr) is defined as $\rho$, a ratio of the speed Nm of the motor-generator 10 to the speed Ns of the sun gear S (i.e., Nm/Ns) is defined as $\beta$, and torques of the ring gear R, the sun gear S, the carrier C, and the motor-generator 10 are defined as Tr, Ts, Tc, and Tm, respectively, equations, as listed below, are met.

$$Tr = -Tc/(1+\rho) \quad (c1)$$

$$Ts = -\rho Tc/(1+\rho) \quad (c2)$$

$$\beta(Tm+Tr) = Ts \quad (c3)$$

Eliminating torques Tr and Ts from Eq. (c3) using Eqs. (c1) and (c2), we obtain $$Tc = (1+\rho)Tm/\{(\rho/\beta)-1\} \quad (c4)$$

Eq. (c4) shows that a great increase in torque Tc of the carrier C of the second planetary gear set 24 (i.e., the output axis of the power split device 20), in other words, the torque to be transmitted to the driven wheels 14 is achieved by approximating the ratios $\rho$ and $\beta$ to each other. This ensures the torque required to start the vehicle without need for increasing the size of the motor-generator 10.

The hybrid system of this embodiment is capable of selecting the gear ratio (i.e., a speed ratio) of the CVT 36 to achieve the so-called geared neutral which places the speed of the driven wheels 14 at zero (0) during running of the motor-generator 10. Specifically, the power split device 20 is so designed that amounts of output rotational energy (i.e., power) of the sun gear S and the ring gear R that are the rotors of the second planetary gear set 24 other than the carrier C coupled to the driven wheels 14 are, as illustrated in FIG. 2(c), opposite in sign to each other. Therefore, when the geared neutral is established to place the speed of the driven wheels 14 at zero (0), it will cause the power to be circulated between the sun gear S and the ring gear R through a looped mechanical path equipped with the clutch 38 and the CVT 36. In other words, when the power split device 20 is in the geared neutral, the amount of rotational energy (i.e., power) outputted to the driven wheels 14 will be zero (0). If the power is not circulated through the looped mechanical path extending through the sun gear S and the ring gear R, it will cause the output energy of the motor-generator 10 to be consumed fully as thermal energy in the second planetary gear set 24 according to the energy conservation law. This will result in impractical structure of the second planetary gear set 24 which does not work to split the power, in other words, in which the rotors do not function as power split rotors of the power split device 20. When the geared neutral is established in the hybrid system of this embodiment, it will cause the power to be recirculated inevitably in the power split device 20. The looped path extending from the ring gear R, to the sun gear S of the second planetary gear set 24, and back to the ring gear R needs not continue mechanically completely. For instance, the looped path may be a path which has a disconnected portion to be closed selectively by a clutch to enable the rotational energy to be recirculated. Note that in FIG. 2(c), the plus (+) and minus (−) signs of the rotational direction of each of the sun gear S, the carrier C, and the ring gear R represent opposite directions: a normal direction and a reverse direction thereof, the plus (+) sign of the rotational energy (i.e., power) indicates when the rotational energy is outputted from the power split device 20, and the plus (+) and minus (−) signs of the torque are so defined as to meet the condition that the product of signs of the rotational direction and the torque will be the sign of the rotational energy (i.e., power).

In the geared neutral, the first planetary gear set 22 does not function to transmit the power. Specifically, the clutch 30 is disengaged, so that the torque of the carrier C will be zero (0), and thus the torque of the sun gear S and the ring gear R will also be zero (0) according to Eqs. (c1) and (c2), as described above.

The starting control of the engine 12 will be described below.

FIGS. 3(a) and 3(b) show an operation of the power transmission device to start the engine 12. FIG. 3(a) illustrates a power transmission path when the engine 12 is started. FIG. 3(b) is a monographic chart which represents the operation of the power split device 20 along with the speed of the engine 12.

When it is required to start the engine 12, the controller 40 (not shown) engages the clutch 30 to transmit the torque from the carrier C of the first planetary gear set 22 (i.e., the torque from the starting axis) to the rotating shaft 12a of the engine 12 through the clutch 30 and the one-way bearing 32, thereby achieving initial rotation of the rotating shaft 12a of the engine 12. The rotating shaft 12a of the engine 12 is driven or rotated by the rotation of the carrier C of the first planetary gear set 22. When the speed of the rotating shaft 12a of the engine 12 is increased to a given value, the controller 40 starts to control the burning of fuel in the engine 12. At an initial stage when the fuel has started to be burned after the engine 12 is cranked, the torque on the rotating shaft 12a rises rapidly, so that the speed thereof increases quickly. At this time, the speed of the rotating shaft 12a is, however, higher than that of the carrier C, so that the torque is not transmitted to the carrier C, so that the pulsation of torque is, thus, not transmitted to the power split device 20 at the initial stage of burning of the engine 12.

The hybrid system of this embodiment is capable of regulating the speed of the carrier C of the first planetary gear set 22 to an extremely low value or exactly to zero (0). Specifically, the first planetary gear set 22 is so linked that when the clutch 30 is engaged to output a positive (+) rotational energy from the carrier C of the first planetary gear set 22 to the engine 12, some (i.e., two in this embodiment) of the power split rotors other than the carrier C of the first planetary gear set 22 are opposite in sign of output rotational energy thereof to each other, thereby enabling the carrier C of the first planetary gear set 22 to be placed at the geared neutral. Referring to FIG. 3(c), the sun gear S and the ring gear R of the first planetary gear set 22 is opposite in sign of output rotational energy (i.e., power) thereof to each other and are coupled to each other through a looped mechanical path, thus enabling the carrier C of the first planetary gear set 22 to be placed at the geared neutral in the same way, as described above with respect to the second planetary gear set 24, without need for two rotary electric machines (e.g., motor-generators): one for receiving the output rotational energy, as produced by the ring gear R, and the other for inputting the output rotational energy to the sun gear S. The looped mechanical path, like in the second planetary gear set 24, needs not continue mechanically and completely.

Upon completion of the starting of the engine 12, the controller 40 disengages the clutch 30. When it is required to restart the engine 12 within a short time after the engine 12 is stopped, it may cause the engine 12 to have been restarted before the speed of the rotating shaft 12a of the engine 12 drops to zero (0). In such an event, the restarting of the engine 12 is achieved by regulating the speed of the motor-generator 10 and/or the gear ratio of the CVT 36 to bring the speed of the sun gear S into agreement with that of the rotating shaft 12a of the engine 12 while keeping the speed of the driven wheels 14 at a required value.

Figure 4A:
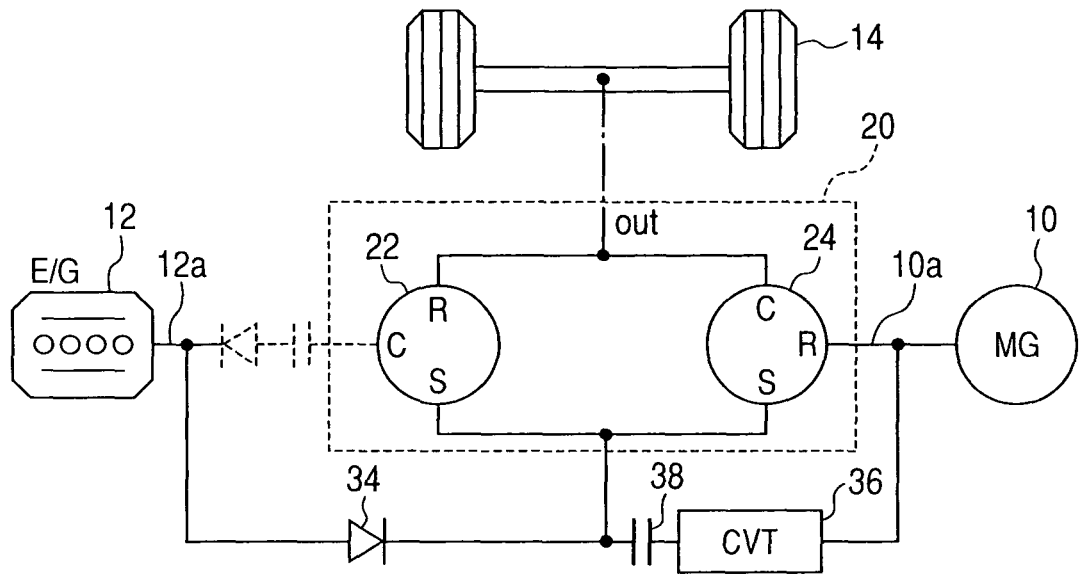
FIG. 4(a) is a schematic block diagram which shows a power transmission path when an internal combustion engine outputs torque to a power split device of FIG. 1(a)
Figure 4B:
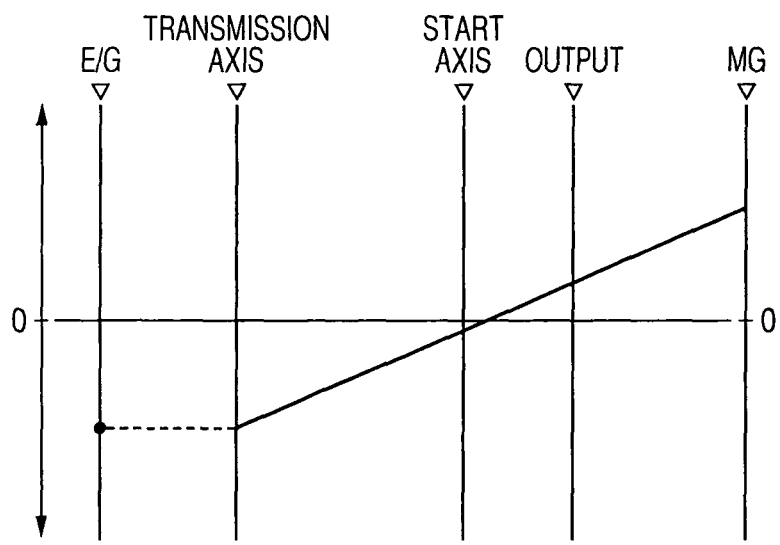
FIG. 4(b) is a monographic chart which represents an operation of a power split device along with the speed of an internal combustion engine.

FIGS. 4(a) and 4(b) show an operation of the power transmission device after the engine 12 is started up. FIG. 4(a) illustrates a power transmission path through which the torque, as outputted from the engine 12 is transmitted. FIG. 4(b) is a monographic chart which represents the operation of the power split device 20 along with the speed of the engine 12. The clutch 30 is disengaged to block the connection between the one-way bearing 32 and the carrier C of the first planetary gear set 22.

After the engine 12 is started up, the speed of the rotating shaft 12a of the engine 12 reaches the speed of the sun gears S of the first and second planetary gear sets 22 and 24 (i.e., the speed of the power transmission axis), thereby giving the torque of the engine 12 to the power split device 20. After the torque is provided from the engine 12 to the power split device 20, the controller 40 may operate the motor-generator 10 as an electric generator or turn off the inverter 42 to place the motor-generator 10 in a no-load operation.

As apparent from the above discussion, the hybrid system of this embodiment is capable of starting the internal combustion engine 12 during running of the vehicle powered by the motor-generator 10, in other words, during the operation of the motor-generator 10 without use of a typical engine starter equipped with an electric motor. The rotor used to start the engine 12 (i.e., the carrier C of the first planetary gear set 22) and the rotors to which the torque of the engine 12 is given (i.e., the sun gears S of the first and second planetary gear sets 22 and 24) are designed to be separate, in other words, disposed independently from each other, thereby enabling the speed of the rotors to which the torque is provided from the engine 12 to be elevated quickly after the starting of the engine 12. This results in an increase in time the engine 12 is run in an effective operation range.

The structure of the hybrid system of this embodiment offers the following advantages.

1) The power transmission device is equipped with a first power transmission control mechanism working to establish or block transmission of power between the first rotor that is a part of the power split device 20 (i.e., the carrier C of the first planetary gear set 22) and the rotating shaft 12a of the engine 12 and a second power transmission control mechanism working to establish or block transmission of power between the second rotors that are parts of the power split device 20 (i.e., the sun gears S of the first and second planetary gear sets 22 and 24) and the rotating shaft 12a of the engine 12. Specifically, the power transmission device works to ensure the start of the engine 12 during the running of the vehicle using the motor-generator 10 and also bring the speed of the engine 12 to an effective speed range quickly.

2) The first power transmission control mechanism is equipped with a one-way transmission mechanism (i.e., the one-way bearing 32) which works to permit the power or torque to be transmitted from the power split device 20 to the engine 12 when the speed of the first rotor (i.e., the carrier C of the first planetary gear set 22) relative to that of the rotating shaft 12a of the engine is not negative or below zero (0). This eliminates the addition of pulsation of torque, as arising from the initial burning of fuel in the combustion chamber of the engine 12, to the power split device 20, thus avoiding undesirable swinging of the vehicle body.

3) The first power transmission control mechanism also includes an electronically-controlled power transmission breaker (i.e., the clutch 30) which block the transmission of power between the first rotor (i.e., the carrier C of the first planetary gear set 22) and the rotating shaft 12a of the engine 12 in addition to the one-way bearing 32. This avoids the transmission of power or torque from the first rotor to the rotating shaft 12a before the engine 12 is to be started, thereby saving the energy consumption.

4) The controller 40 disengages the clutch 30 after the start-up of the engine 12, thereby minimizing the supply of electric power to the clutch 30.

5) The second power transmission control mechanism is equipped with a one-way transmission mechanism (i.e., the one-way bearing 34) which works to permit the power or torque to be transmitted from the generator-motor 10 to the engine 12 when the speed of the rotating shaft 12a of the engine relative to that of the second rotor (i.e., the sun gears S of the first and second planetary gear sets 22 and 24) is not negative or below zero. The torque, as produced by the engine 12, is therefore transmitted to the sun gears S when the speed of the rotating shaft 12a of the engine 12 becomes identical with that of the sun gears S. The use of the second power transmission control mechanism results in simplicity of control of start of addition of torque from the engine 12 to the sun gears S and also permits the speed of the engine 12 to be controlled below that of the sun gears S to place the engine 12 in a no-load operation when the power of the engine 12 is not required.

6) The speed of the carrier C of the first planetary gear set 22 at which the initial torque is to be added to the engine 12 is selected to be lower than or equal to the speed of the sun gears S of the first and second planetary gear sets 22 and 24, thereby bringing the engine 12 to the effective operation range quickly immediately after the engine 12 is started up.

7) The power split device 20 is equipped with the three or more rotors (i.e., the three rotors S, C, and R of the first planetary gear set 22 in this embodiment) which are designed to have speeds thereof lying on the straight line in the monographic chart and uses one of the three or more rotors which is to have the middle of the speeds in the monographic chart as a rotor for giving the initial torque to the engine 12, thereby resulting in a decreased difference in speed between that rotor and the rotating shaft 12a of the engine 12 immediately before the engine 12 is started.

8) Two of the rotors (i.e., the rotors of the second planetary gear set 24 in this embodiment) which are to have the right and left ends of the speeds in the monographic chart are joined mechanically to the motor-generator 10, thereby enabling the motor-generator 10 to be run in an increased effective operation range.

9) Of the two of the rotors of the second planetary gear set 24, as described above, which are to have the rightmost and leftmost ones of the speeds in the monographic chart, respectively, one is joined mechanically with the motor-generator 10 through the CVT 36, thereby enabling the two of the rotors to be controlled in speed independently from each other like the case where two motor-generators are used in connection with the two of the rotors, respectively. In the case of use of such two motor-generators, this structure may also eliminate the loss of electric energy, as produced by one of the motor-generators which is operating as a generator, when the electric energy is supplied to the other motor-generator operating as an electric motor.

10) Of the four rotor groups (i.e., (a) the sun gears S of the first and second planetary gear sets 22 and 24, (b) the carrier C of the first planetary gear set 22, (c) the ring gear R of the first planetary gear set 22 and the carrier C of the second planetary gear set 24, and (d) the ring gear R of the second planetary gear set 24 in the first embodiment) which are to have different speeds in the monographic chart, respectively, one (i.e., the ring gear R of the first planetary gear set 22 and the carrier C of the second planetary gear set 24) other than one used to add the initial torque to the engine 12 for starting it is joined mechanically with the driven wheels 14, thereby facilitating ease of rotating the driven wheels 14 in a normal or a reverse direction and stopping them. The speed of the rotor for use in giving the initial torque to the engine 12 may be set independently from that of the driven wheels 14.

11) The power split device 20 is designed to joint two of the three rotor of the first planetary gear set 22 mechanically to two of the three rotors of the second planetary gear set 24, respectively, thereby enabling the four groups of the power split device 20 to be arrayed in speed on the straight line in the monographic chart, as illustrated in FIG. 2(b).

Figure 5:
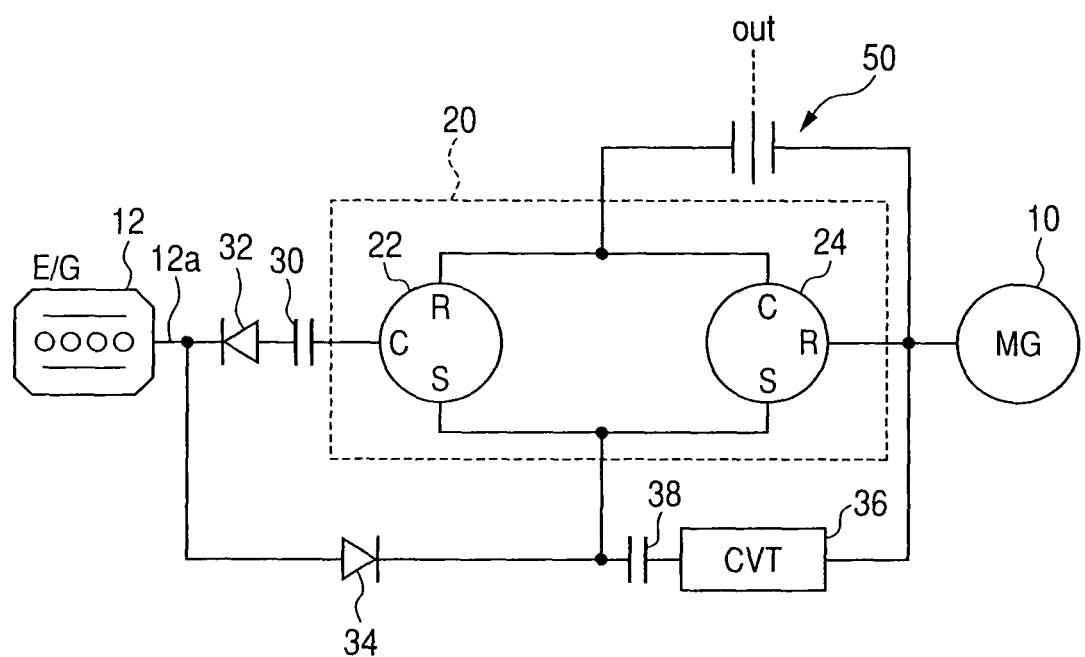
FIG. 5 is a block diagram which illustrates a power transmission device according to the second embodiment of the invention.

FIG. 5 illustrates a hybrid system according to the second embodiment of the invention. The same reference numbers as employed in FIG. 1 refer to the same parts, and explanation thereof in detail will be omitted here.

The hybrid system of this embodiment is designed to switch between the rotors of the power split device 20 which are to be connected mechanically to the driven wheels 14 of the vehicle. Specifically, the hybrid system, as clearly illustrated in FIG. 5, includes an electronically controlled clutch 50 which works as a switch or selector to select one of (a) a pair of the ring gear R of the first planetary gear set 22 and the carrier C of the second planetary gear set 24 and (b) the ring gear R of the second planetary gear set 24 which is to be coupled to the driven wheels 14.

The use of the clutch 50 enables the motor-generator 10 or the engine 12 to be run in an increased effective operation range. For example, increasing of the speed of the driven wheels 14 coupled to the ring gear R of the first planetary gear set 22 and the carrier C of the second planetary gear set 24 during the operation of the motor-generator 10 requires increasing the speed of the motor-generator 10 above that of the driven wheels 14. The increasing of the speed of the motor-generator 10 up to an inefficient operation range will result in an increase in consumed amount of energy in the hybrid system. In order to alleviate this problem, when the inefficient operation range is entered, the controller 40 connects the driven wheels 14 mechanically to the ring gear R of the second planetary gear set 24, thereby eliminating the need for increasing the speed of the motor-generator 10 above that of the driven wheels 14. Similarly, when the driven wheels 14 are being powered by the internal combustion engine 12, the controller 40 may work to switch between the rotors of the power split device 20 which are to be connected mechanically to the driven wheels 14 in a range where it is difficult to run the engine 12 effectively only through control of the CVT 36 in order to keep the engine 12 running in the effective operation range.

The switching of a first mode in which the driven wheels 14 are coupled to the ring gear R of the first planetary gear set 22 and the carrier C of the second planetary gear set 24 to a second mode in which the driven wheels 14 are coupled to the ring gear R of the second planetary gear set 24 is achieved by operating the clutch 50 to block the transmission of torque from the ring gear R of the first planetary gear set 22 and the carrier C of the second planetary gear set 24 to the driven wheels 14, bringing the speed of the motor-generator 10 to that of the driven wheels 14, and operating the clutch 50 to establish a mechanical connection of the ring gear R of the second planetary gear set 24 to the driven wheels 14. Conversely, the switching of the second mode in which the driven wheels 14 are coupled to the ring gear R of the second planetary gear set 24 to the first mode in which the driven wheels 14 are coupled to the ring gear R of the first planetary gear set 22 and the carrier C of the second planetary gear set 24 is achieved by operating the clutch 50 to block the transmission of torque from the ring gear R of the second planetary gear set 24 to the driven wheels 14, controlling the operation of the motor-generator 10 to bring the speed of the ring gear R of the first planetary gear set 22 and the carrier C of the second planetary gear set 24 to that of the driven wheels 14, and operating the clutch 50 to establish a mechanical connection of the ring gear R of the first planetary gear set 22 and the carrier C of the second planetary gear set 24 to the driven wheels 14.

The structure of the hybrid system of this embodiment also have the following advantage in addition to the advantages (1) to (11), as described above.

12) The clutch 50 is provided to select one or two of the rotors of the power split device 20 which is or are to be connected mechanically to the driven wheels 14 as a function of a required speed of the driven wheels 14 to keep the motor-generator 10 or the engine 12 running in the preselected effective operation range.

Figure 6A:
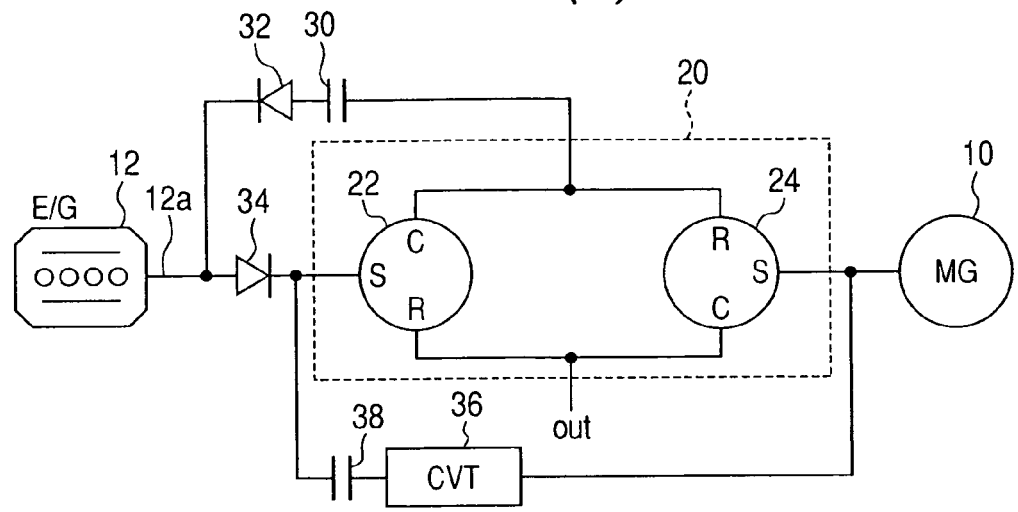
FIG. 6(a) is a block diagram which illustrates a power transmission device according to the third embodiment of the invention.
Figure 6B:
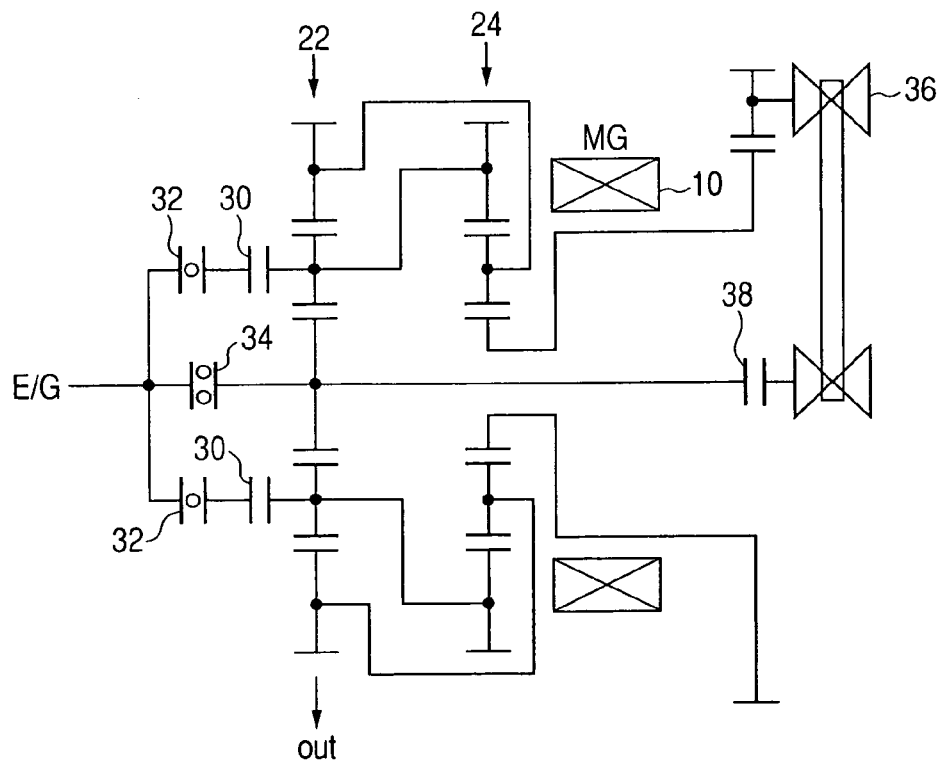
FIG. 6(b) is a skeleton view of power transmission paths of the power transmission device of FIG. 6(a)

FIGS. 6(a) and 6(b) illustrate a hybrid system according to the third embodiment of the invention. The same reference numbers as employed in FIG. 1 refer to the same parts, and explanation thereof in detail will be omitted here.

The power split device 20 has the first planetary gear set 22 connected mechanically at the carrier C thereof to the ring gear R of the second planetary gear set 24. The carrier C and the ring gear R work as engine starting rotors of the power split device 20 to provide the initial torque to the engine 12. The ring gear R of the first planetary gear set 22 is coupled mechanically to the carrier C of the second planetary gear set 24, which are in turn connected mechanically to the driven wheels 14. For the sake of simplicity of illustration, the driven wheels 14 are omitted from FIGS. 6(a) and 6(b). Instead, a path connected mechanically to the driven wheels 14 is expressed by "out". The sun gear S of the first planetary gear set 22 is used as the rotor which is connected to the power transmission axis and to which the torque, as produced by the engine 12, is transmitted. The sun gear S of the first planetary gear set 22 is also connected mechanically to the motor-generator 10 through the CVT 36. The motor-generator 10 is also connected mechanically to the sun gear S of the second planetary gear set 24.

The structure of the hybrid system of this embodiment provides substantially the same advantages (1) to (11), as described above.

Figure 7A:
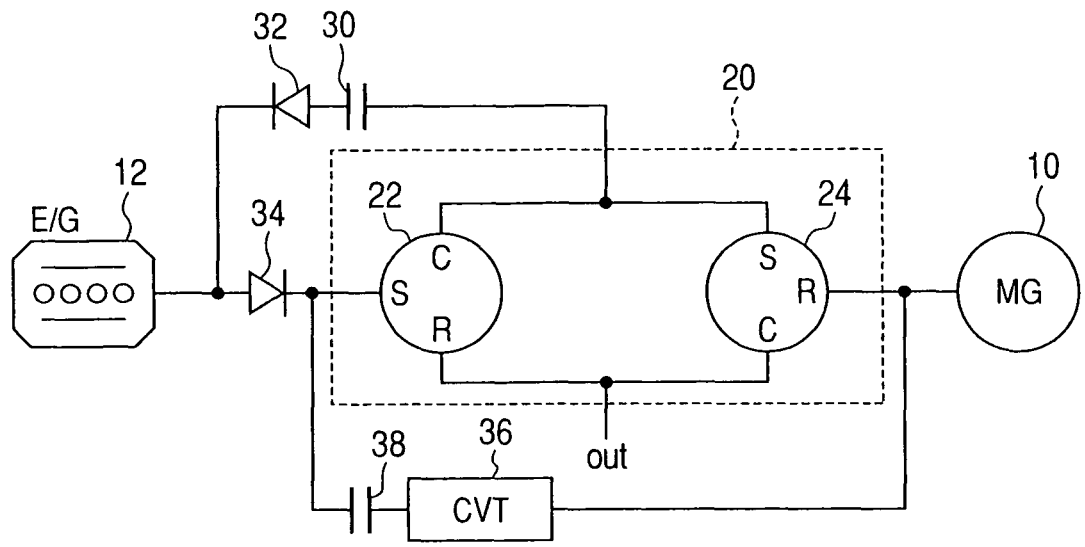
FIG. 7(a) is a block diagram which illustrates a power transmission device according to the fourth embodiment of the invention.
Figure 7B:
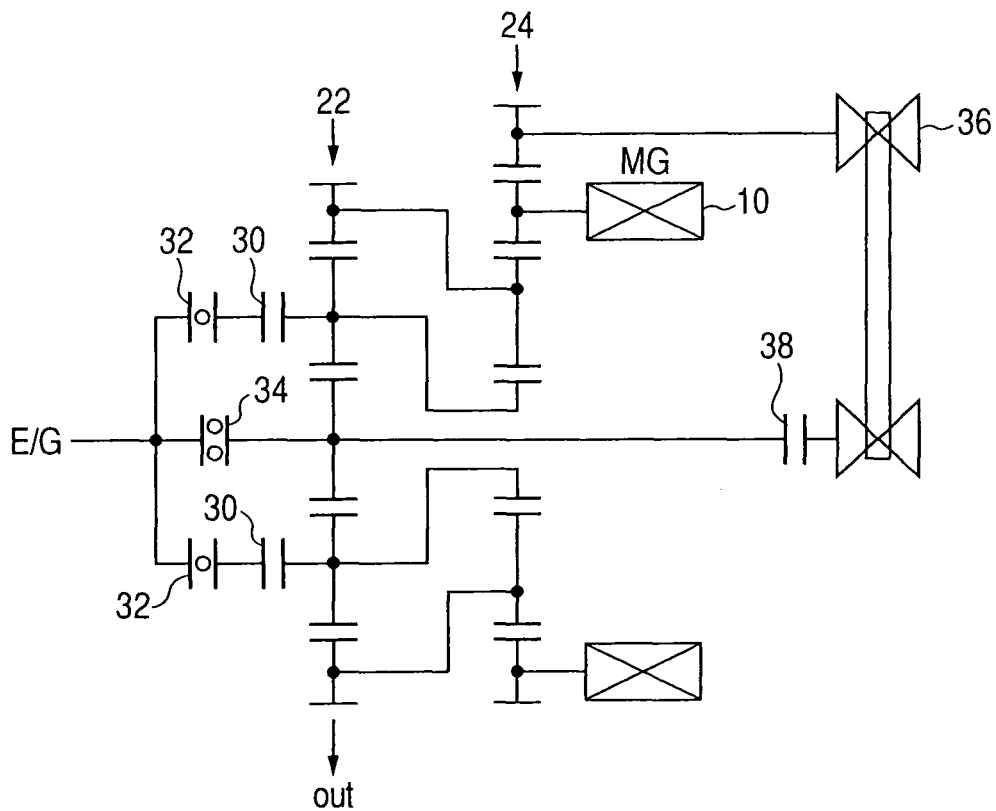
FIG. 7(b) is a skeleton view of power transmission paths of the power transmission device of FIG. 7(a)

FIGS. 7(a) and 7(b) illustrate a hybrid system according to the fourth embodiment of the invention. The same reference numbers as employed in FIG. 1 refer to the same parts, and explanation thereof in detail will be omitted here.

The power split device 20 has the first planetary gear set 22 connected mechanically at the carrier C thereof to the sun gear S of the second planetary gear set 24. The carrier C and the sun gear S work as engine starting rotors of the power split device 20 to provide the initial torque to the engine 12. The ring gear R of the first planetary gear set 22 is coupled mechanically to the carrier C of the second planetary gear set 24, which are in turn connected mechanically to the driven wheels 14. For the sake of simplicity of illustration, the driven wheels 14 are omitted from FIGS. 7(a) and 7(b). Like in FIGS. 6(a) and 6(b), the path connected mechanically to the driven wheels 14 is expressed by "out". The sun gear S of the first planetary gear set 22 is used as the rotor which is connected to the power transmission axis and to which the torque, as produced by the engine 12, is transmitted. The sun gear S of the first planetary gear set 22 is also connected mechanically to the motor-generator 10 through the CVT 36. The motor-generator 10 is also connected mechanically to the ring gear R of the second planetary gear set 24.

The structure of the hybrid system of this embodiment provides substantially the same advantages (1) to (11), as described above.

Figure 8A:
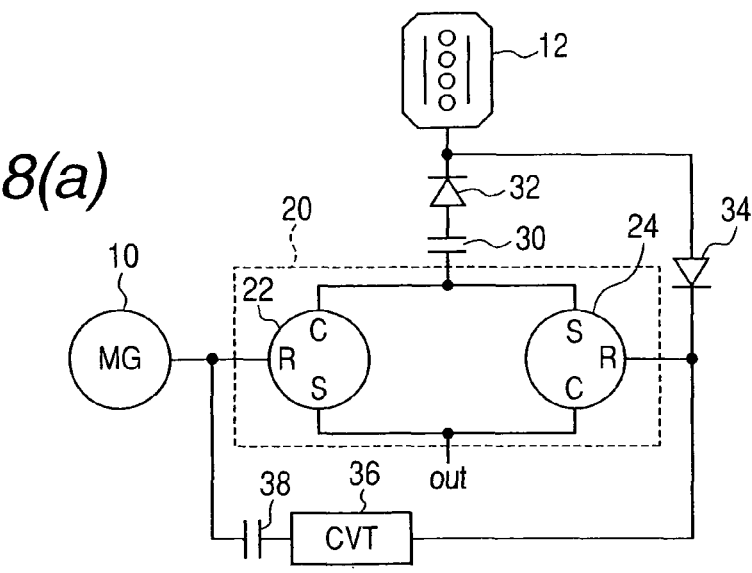
FIG. 8(a) is a block diagram which illustrates a power transmission device according to the fifth embodiment of the invention.
Figure 8B:
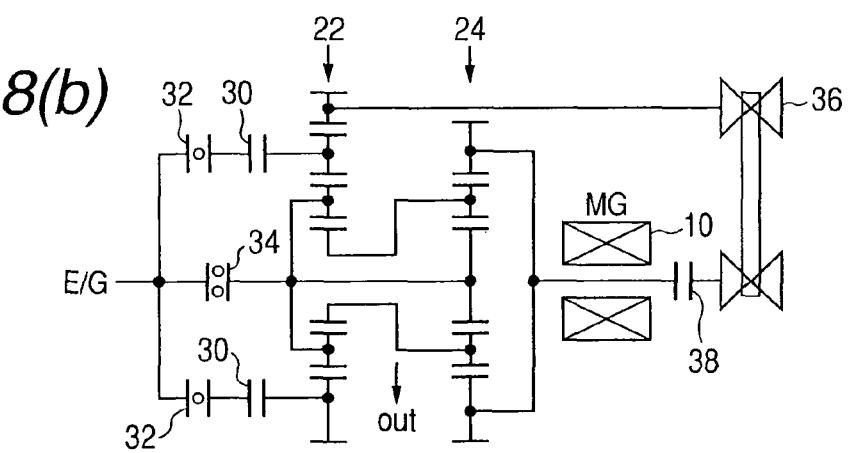
FIG. 8(b) is a skeleton view of power transmission paths of a modification of a power transmission device.
Figure 8C:
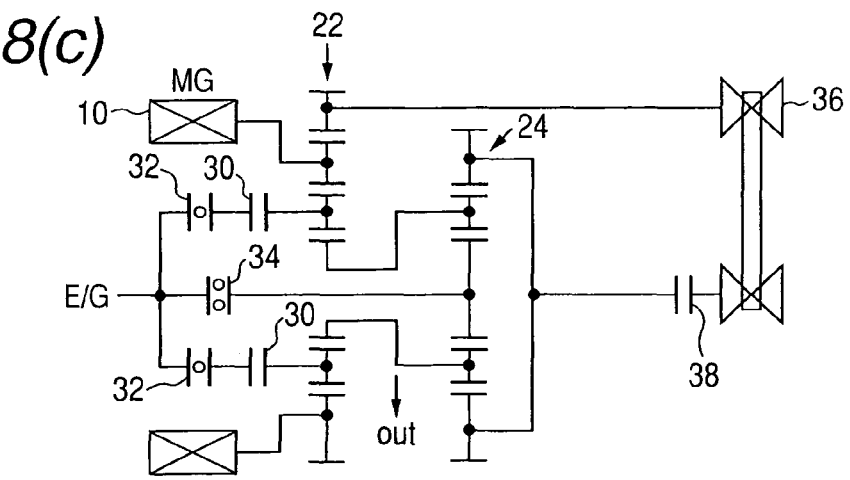
FIG. 8(c) is a skeleton view of power transmission paths of a modification of a power transmission device.

FIGS. 8(a) to 8(c) illustrate a hybrid system according to the fifth embodiment of the invention. The same reference numbers as employed in FIG. 1 refer to the same parts, and explanation thereof in detail will be omitted here.

The power split device 20 has the first planetary gear set 22 connected mechanically at the carrier C thereof to the sun gear S of the second planetary gear set 24. The carrier C and the sun gear S work as engine starting rotors of the power split device 20 to provide the initial torque to the engine 12. The sun gear S of the first planetary gear set 22 is coupled mechanically to the carrier C of the second planetary gear set 24, which are in turn connected mechanically to the driven wheels 14. For the sake of simplicity of illustration, the driven wheels 14 are omitted from FIGS. 8(a) to 8(c). Like in FIGS. 7(a) and 7(b), the path connected mechanically to the driven wheels 14 is expressed by "out". The ring gear R of the second planetary gear set 24 is used as the rotor which is connected to the power transmission axis to which the torque, as produced by the engine 12, is transmitted. The ring gear R of the second planetary gear set 24 is also connected mechanically to the motor-generator 10 through the CVT 36. The motor-generator 10 is also connected mechanically at the rotating shaft 10a thereof to the ring gear R of the first planetary gear set 22.

FIGS. 8(b) and 8(c) are skeleton views which illustrate connections of the rotors of modifications of the power split device 20 and power transmission paths among the engine 12, the driven wheels 14, and the generator-motor 10.

The structure of the hybrid system of this embodiment provides substantially the same advantages (1) to (11), as described above.

Figure 9A:
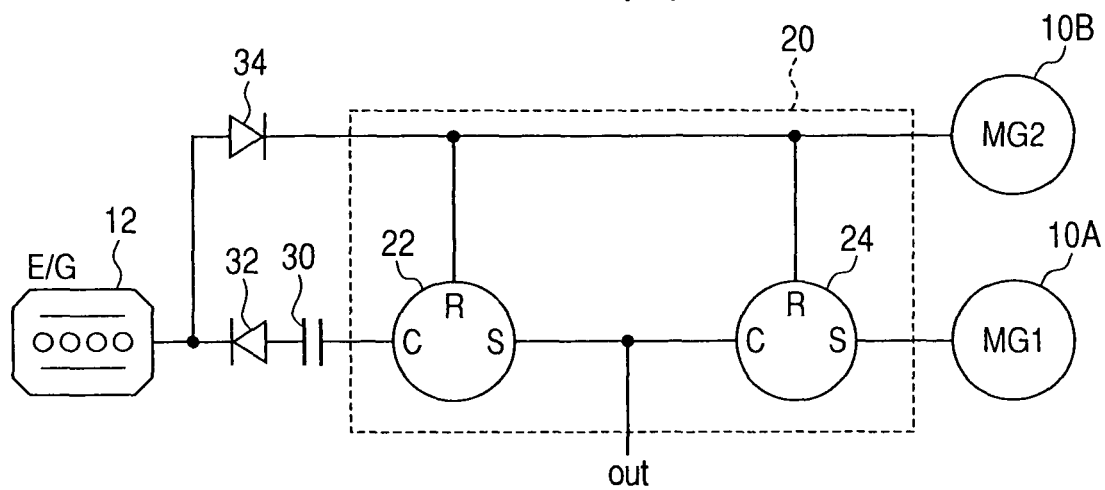
FIG. 9(a) is a block diagram which illustrates a power transmission device according to the sixth embodiment of the invention.
Figure 9B:
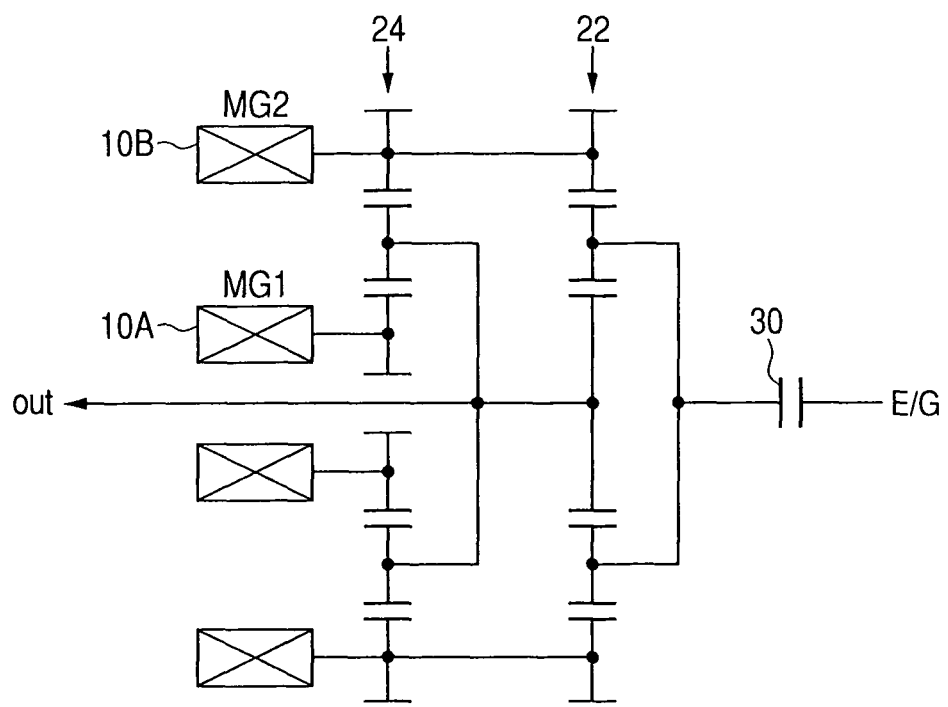
FIG. 9(b) is a skeleton view of power transmission paths of the power transmission device of FIG. 9(a)

FIGS. 9(a) and 9(b) illustrate a hybrid system according to the sixth embodiment of the invention. The same reference numbers as employed in FIG. 1 refer to the same parts, and explanation thereof in detail will be omitted here.

The power split device 20 has the first planetary gear set 22 connected mechanically at the ring gear R thereof to the ring gear R of the second planetary gear set 24. The ring gears R of the first and second planetary gear sets 22 and 24 are also connected mechanically to a second motor-generator 10B and work as rotors of the power split device 20 to which the torque, as produced by the engine 12, is transmitted through the one-way bearing 34. The sun gear S of the first planetary gear set 22 is coupled mechanically to the carrier C of the second planetary gear set 24, which are in turn connected mechanically to the driven wheels 14. For the sake of simplicity of illustration, the driven wheels 14 are omitted from FIGS. 9(a) and 9(b). Like in FIGS. 8(a) and 8(b), the path connected mechanically to the driven wheels 14 is expressed by "out". The sun gear S of the second planetary gear set 24 is coupled mechanically to a first motor-generator 10A. The carrier C of the first planetary gear set 22 works as an engine starting rotor of the power split device 20 to provide the initial torque to the engine 12.

FIG. 9(b) is a skeleton view which illustrates a power transmission path to start the engine 12. FIG. 9(b) omits the one-way bearings 32 and 34 for the sake of simplicity of illustration.

Both the motor-generators 10A and 10B do not always necessarily function as a motor-generator. At least either of them may work as the motor-generator. For example, in the case where the first motor-generator 10A is designed to operate as only a generator, the electric energy, as produced by the first motor-generator 10A, is consumed by the second motor-generator 10B working as an electric motor to drive the vehicle. The first motor-generator 10A working as only the generator is used to provide a braking effort when it is required to brake the vehicle and also to control the speed of the rotors of the power split device 20.

The structure of the hybrid system of this embodiment provides substantially the same advantages (1) to (8) and (10) to (11), as described above.

Figure 10A:
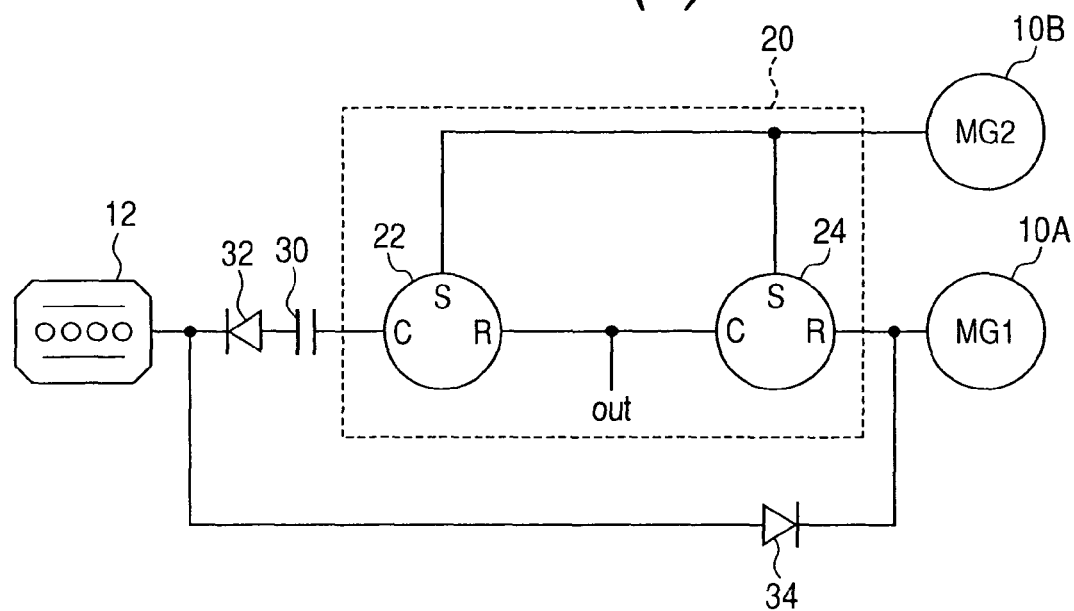
FIG. 10(a) is a schematic block diagram which shows a power transmission path according to the seventh embodiment of the invention.
Figure 10B:
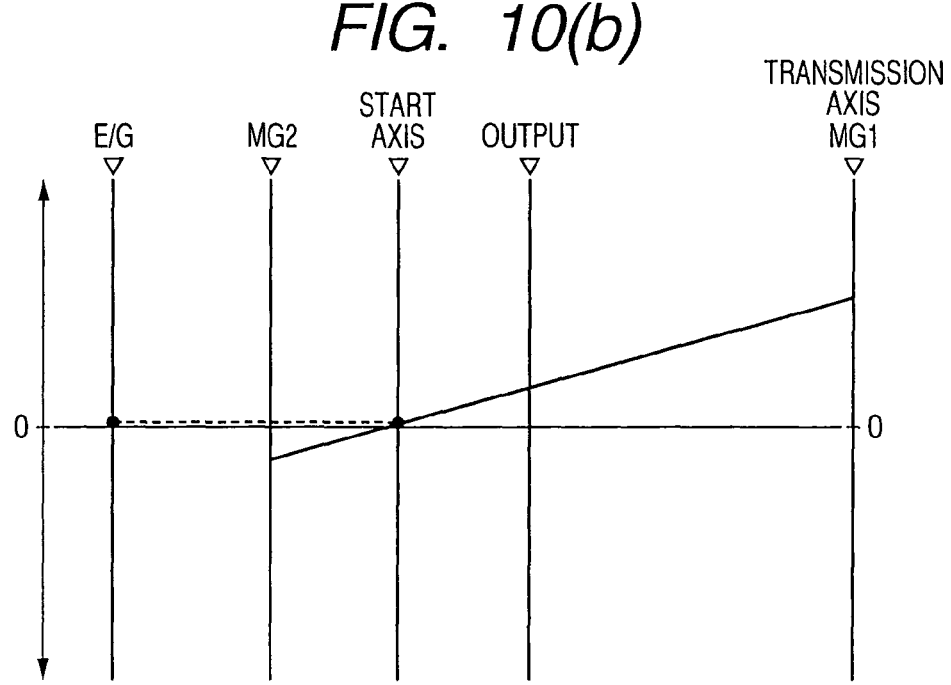
FIG. 10(b) is a monographic chart which represents an operation of a power split device of the power transmission device of FIG. 10(a) along with the speed of an internal combustion engine.

FIGS. 10(a) and 10(b) illustrate a hybrid system according to the seventh embodiment of the invention. The same reference numbers as employed in FIG. 1 refer to the same parts, and explanation thereof in detail will be omitted here.

The power split device 20 has the first planetary gear set 22 connected mechanically at the ring gear R thereof to the ring gear R of the second planetary gear set 24. The ring gears R of the first and second planetary gear sets 22 and 24 are also connected mechanically to the second motor-generator 10B. The ring gear R of the first planetary gear set 22 is coupled mechanically to the carrier C of the second planetary gear set 24, which are in turn connected mechanically to the driven wheels 14. For the sake of simplicity of illustration, the driven wheels 14 are omitted from FIGS. 10(a) and 10(b). Like in FIGS. 9(a) and 9(b), the path connected mechanically to the driven wheels 14 is expressed by "out". The ring gear R of the second planetary gear set 24 is coupled mechanically to the first motor-generator 10A and works as the rotor of the power split device 20 to which the torque of the engine 12 is transmitted through the one-way bearing 34. The carrier C of the first planetary gear set 22 works as the engine starting rotor to provide the initial torque to the engine 12.

The speed of the rotor of the power split device 20 (i.e., the carrier C of the first planetary gear set 22) used to provide the initial torque to the engine 12 when it is required to start the engine 12 and the speed of the rotor connected mechanically to the first motor-generator 10A are set identical in sign in the monographic chart of FIG. 10(b). After the engine 12 is started up, the torque of the engine 12 is given to the rotor of the power split device 20 (i.e., the ring gear R of the second planetary gear set 24).

Figure 11A:
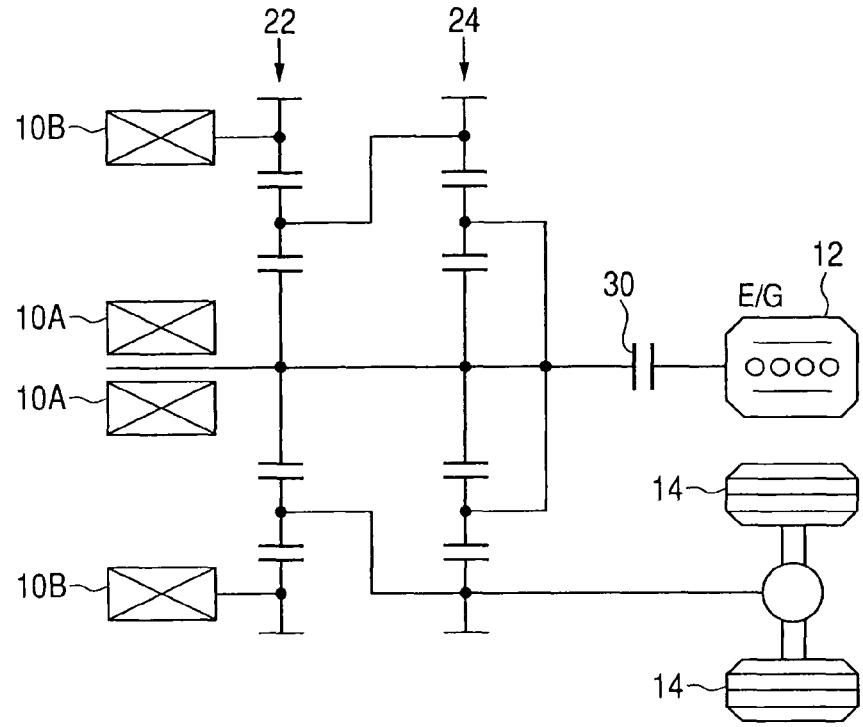
FIGS. 11(a) and 11(b) are skeleton views which illustrate power transmission paths of the power transmission device of FIG. 10(a) in cases where the power transmission device s installed in a front engine front wheel drive (FF) vehicle and a front engine rear wheel drive (FR) vehicle, respectively.
Figure 11B:
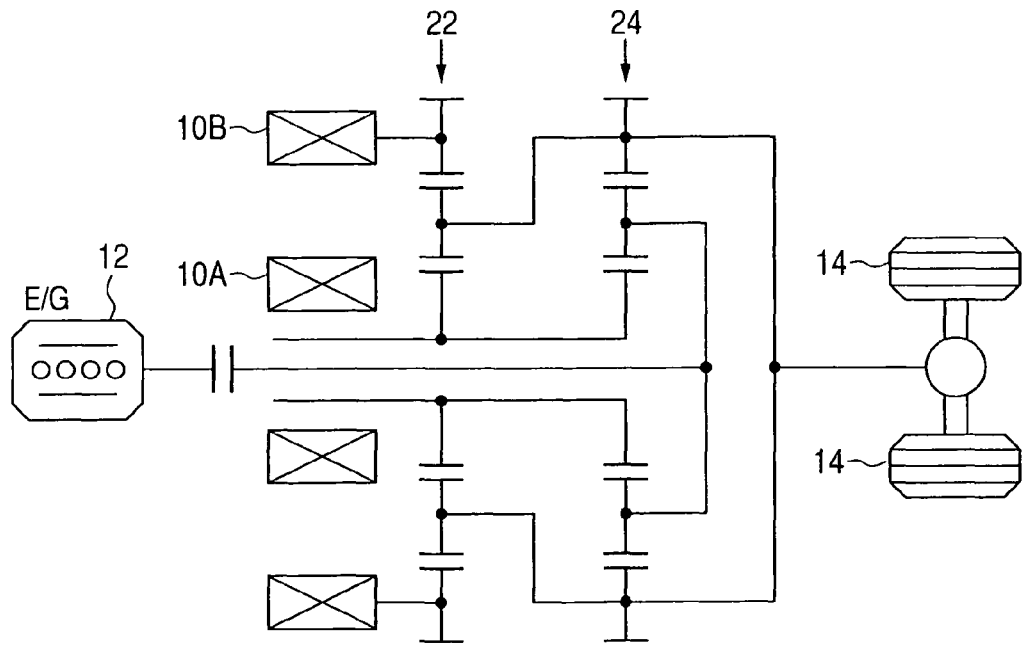

FIGS. 11(a) and 11(b) are skeleton views which illustrate power transmission paths when the engine 12 is started in cases where the hybrid system is installed in a front engine front wheel drive (FF) vehicle and a front engine rear wheel drive (FR) vehicle, respectively. The one-way bearings 32 and 34 are omitted for the sake of simplicity of illustration.

The structure of the hybrid system of this embodiment provides substantially the same advantages (1) to (8) and (10) to (11) as discussed above.

The above first to seventh embodiments may be modified as discussed below.

Figure 12A:
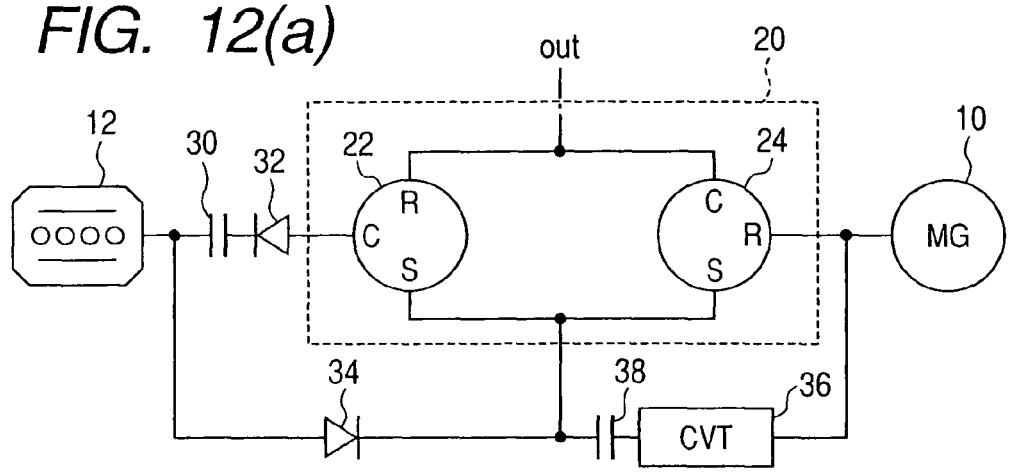
FIGS. 12(a), 12(b), and 12(c) are block diagrams which illustrate modifications of the power transmission device of the first embodiment.

The hybrid system of the above embodiments has the clutch 30 disposed between the one-way bearing 32 and the power split device 20 to establish the transmission of torque from the power split device 20 to the rotating shaft 12a of the engine 12 selectively for starting the engine 12, however, the clutch 30 may alternatively be installed, as illustrated in FIG. 12(a), between the one-way bearing 32 and the rotating shaft 12a of the engine 12. This modification is illustrated in FIG. 12(a) as applied to the structure of the first embodiment.

The clutch 30 used to open or close the power transmission path between the power split device 20 and the engine 12 is of a normally open type, but may be of a normally closed type. In this case, it is preferable to keep the clutch 20 engaged even after the engine 12 is started up in terms of reduction in power consumed by the clutch 30.

The clutch 30 may be omitted from the structure of each of the first to seventh embodiment. Even in the absence of the clutch 30, the advantages (1), (2), and (4) to (11), as described above, are obtained.

The one-way bearing 32 is disposed between the power split device 20 and the engine 12 to establish the transmission of power to the engine 12 when the speed of the starting axis (i.e., a power input side of the one-way bearing 32) of the power split device 20 is greater than or equal to that of the rotating shaft 12a (i.e., a power output side of the one-way bearing 32) of the engine 12, however, a one-way clutch or another similar type working to have the rotating shaft 12a follow the rotation of the starting axis of the power split device 20 with or without slip may be used.

Figure 12B:
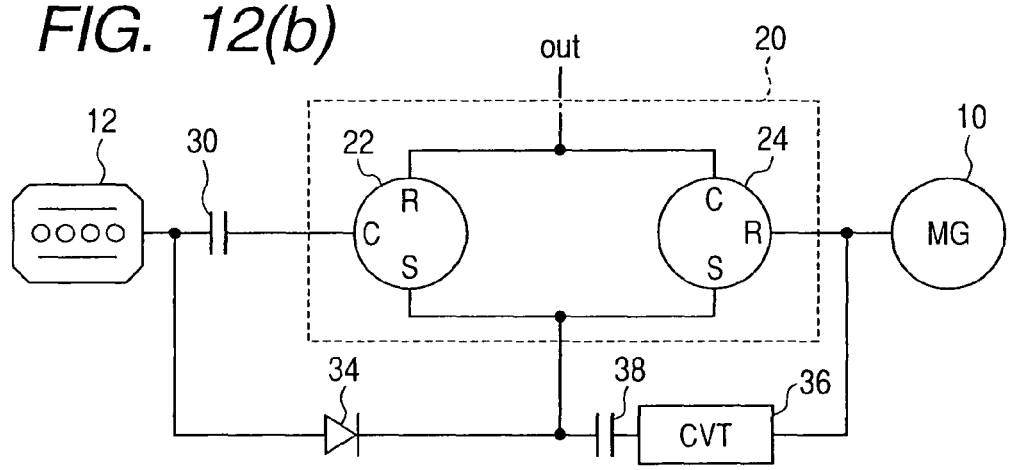

The one-way bearing 32 working to establish or block the transmission of torque from the starting axis of the power split device 20 to the rotating shaft 12a of the engine 12 may be omitted. In other words, only the clutch 30 may be disposed between the rotating shaft 12a and the starting axis of the power split device 20. After the engine 12 is started up, the controller 40 disengages the dutch 30 to block the connection between the engine 12 and the power split device 20, so that the rotors (i.e., the sun gears S) of the power split device 20 which are higher in speed than the starting axis (i.e., the carrier C of the first planetary gear set 22) of the power split device 20 are connected to the engine 12. This modification is illustrated in FIG. 12(b) as applied to the structure of the first embodiment.

The one-way bearing 34 is disposed between the power split device 20 and the engine 12 to establish the transmission of power from the engine 12 to the power transmission axis of the power split device 20 when the speed of the rotating shaft 12a (i.e., a power input side of the one-way bearing 34) of the engine 12 is greater than or equal to that of the power transmission axis (i.e., a power output side of the one-way bearing 334) of the power split device 20, however a one-way clutch or another similar type working to have the power transmission axis follow the rotation of the rotating shaft 12a of the engine 12 with or without slip may be used.

Figure 12C:
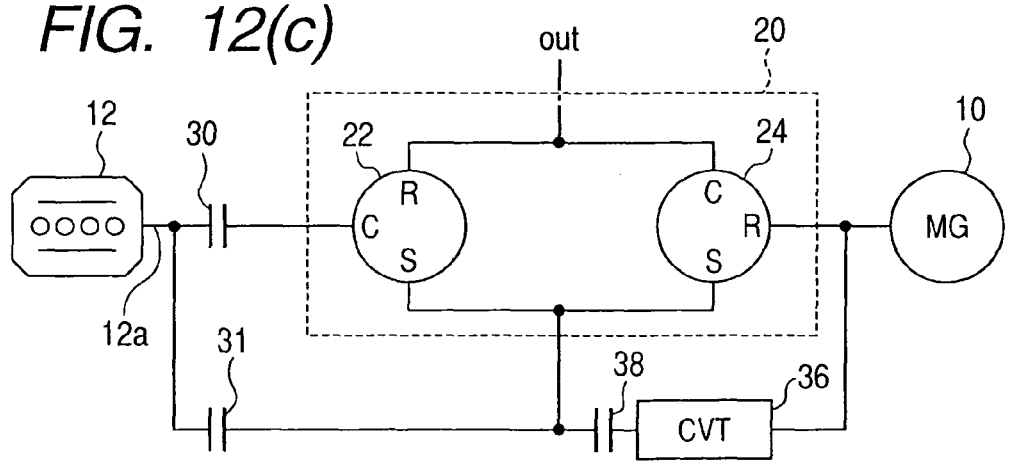

The one-way bearing 34 may be replaced with a clutch similar in structure to the clutch 30. In this case, the controller 40 engages the clutch when the speed of the engine 12 is equal to that of the power transmission axis of the power split device 20 to ensure the stability in connecting the rotating shaft 12a of the engine 12 and the power transmission axis. This modification is illustrated in FIG. 12(c) as applied to the structure of the first embodiment. Specifically, a clutch 31 is disposed between the rotating shaft 12a of the engine 12 and the power transmission axis of the power split device 20 to establish or block the mechanical connection therebetween. In the illustrated case, the one-way bearing 32 is also omitted.

Figure 13A:
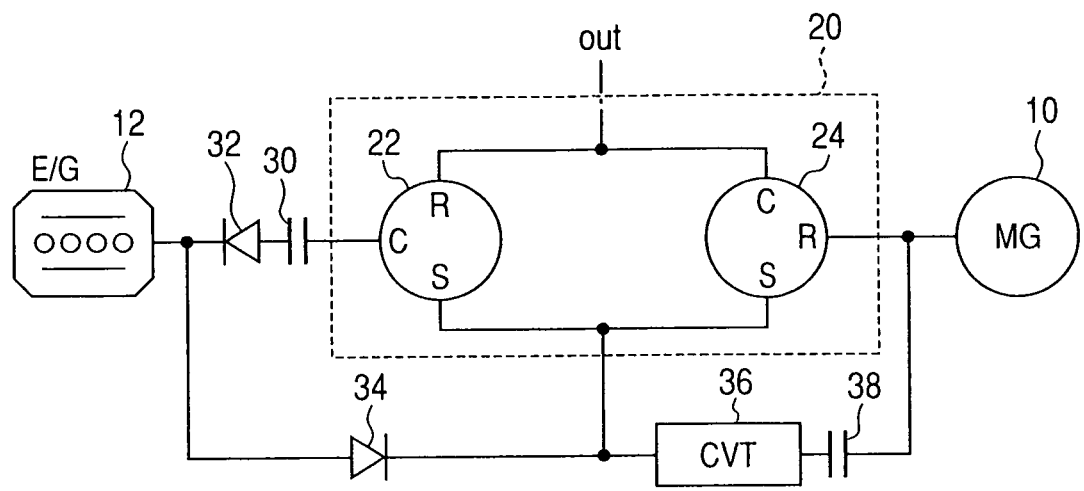
FIGS. 13(a) and 13(b) are block diagrams which illustrate modifications of the power transmission device of the first embodiment.
Figure 13B:
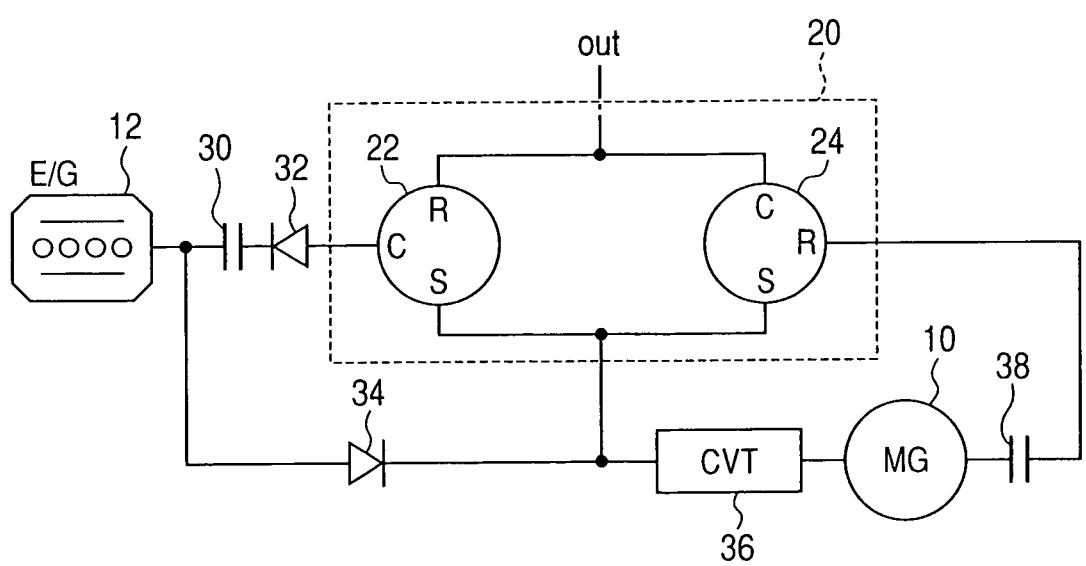

The hybrid systems of the first to fifth embodiments are equipped with the clutch 38 which is disposed between the CVT 36 and the power split device 20 to block the mechanical connection of the motor-generator 10 to the power split device 20 through the CVT 36, however, the clutch 38 may be, as illustrated in FIG. 13(a), installed between the motor-generator 10 and the CVT 36. The clutch 38 may also alternatively be installed, as illustrated in FIG. 13(b), between the motor-generator 10 and the power split device 20.

Figure 14A:
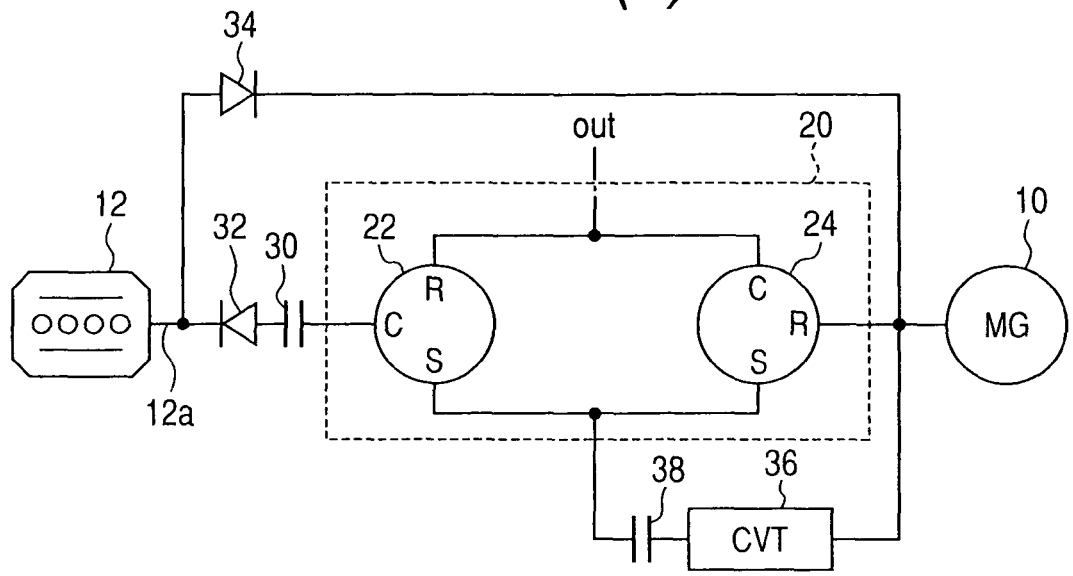
FIGS. 14(a) and 14(b) are block diagrams which illustrate modifications of the power transmission device of the first embodiment, respectively.
Figure 14B:
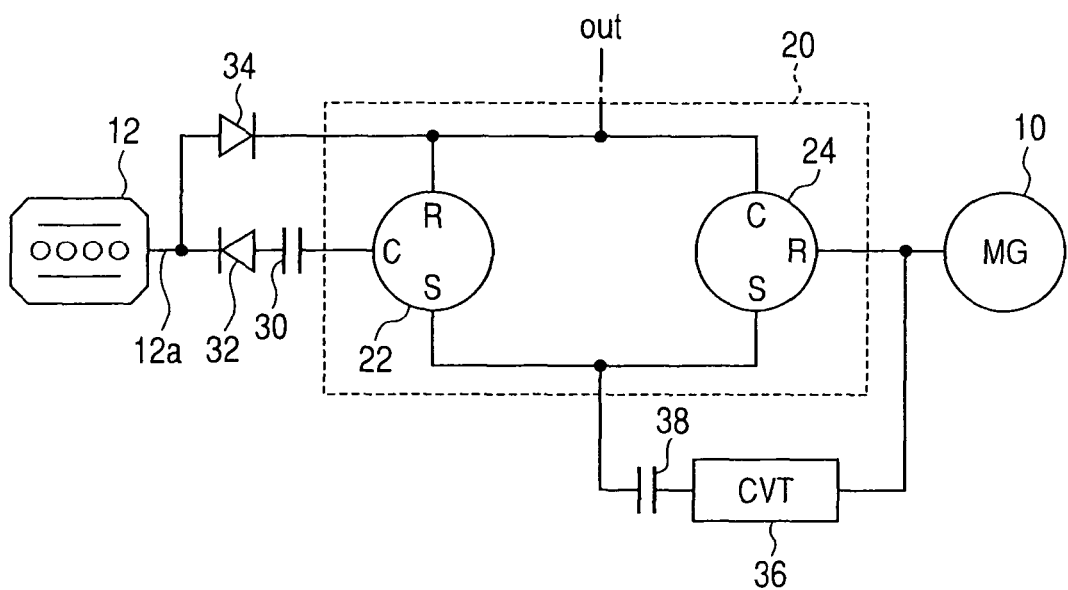

The power transmission axis of the power split device 20 in the first embodiment is the shaft connecting with the sun gears S of the first and second planetary gear sets 22 and 24, however, may alternatively be, as illustrated in FIG. 14(a), the shaft connecting with the ring gear R of the second planetary gear set 24. The shaft, as illustrated in FIG. 14(b), connecting with the ring gear R of the first planetary gear set 22 and the carrier C of the second planetary gear set 24 may alternatively used as the power transmission axis. In the case, like in the first embodiment or in FIG. 14(a), where the rotating shaft 12a of the engine 12 is connected mechanically to the power split device 20 without the CVT 36 and also thereto through the CVT 36, the speed of each of the rotors of the power split device 20 may be controlled only using the engine 12. This permits the controller 40 to adjust the speed of the driven wheels 14 to a desired value while the motor-generator 10 is stopped. Similarly, the power transmission axis of the power split device 20 in each of the second to fifth embodiments may be the shaft connecting mechanically with the rotating shaft 10a of the motor-generator 10 without the CVT 36.

The hybrid systems of the above embodiments may be designed to start the vehicle using the engine 12 instead of the motor-generator 10.

The structure of the second embodiment equipped with the clutch 50 may be used with that of each of the third to seventh embodiments. In this case, the rotor(s) of the power split device 20 which is to be connected mechanically to the driven wheels 14 needs not always be identical in sign of the rotational speed with the driven wheels 14 in the monographic chart. The use of a directional control mechanism working to change the direction of rotation of the rotor(s) permits the power transmission path to be connected from the power split device 20 to the driven wheels 14 to be switched selectively.

Figure 15A:
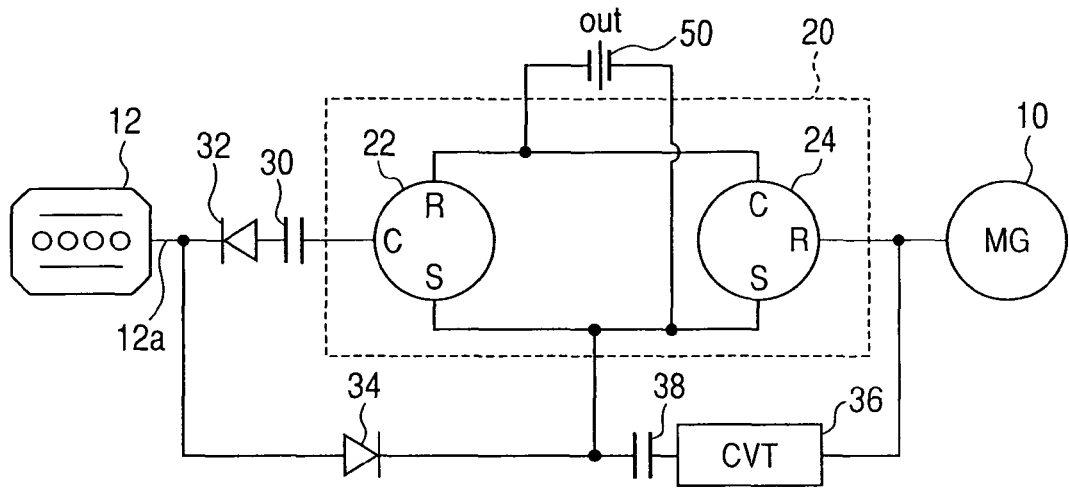
FIGS. 15(a) and 15(b) are block diagrams which illustrate modifications of the power transmission device of the second embodiment.
Figure 15B:
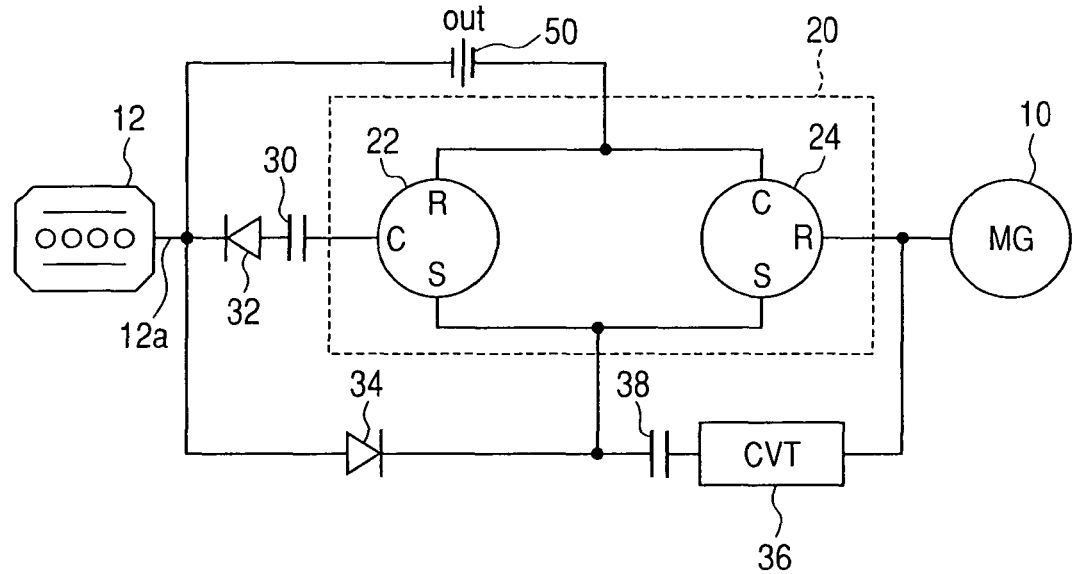

The structure of the second embodiment of FIG. 5 may be modified as illustrated in FIG. 15(a) or 15(b).

Specifically, the clutch 50 in FIG. 15(a) works to select one of (a) a pair of the ring gear R of the first planetary gear set 22 and the carrier C of the second planetary gear set 24 and (b) a pair of the sun gears S of the first and second planetary gear sets 22 and 24 which is to be coupled mechanically to the driven wheels 14. The clutch 50 in FIG. 15(b) works to select one of (a) a pair of the ring gear R of the first planetary gear set 22 and the carrier C of the second planetary gear set 24 and (b) the rotating shaft 12a of the internal combustion engine 12 which is to be coupled mechanically to the driven wheels 14. In other words, the clutch 50 of FIG. 15(*b*) switches between a connection of the driven wheels 14 to the ring gear R of the first planetary gear set 22 and the carrier C of the second planetary gear set 24 and a direct connection of the driven wheels 14 to the engine 12. Note that a counter gear (not shown) is actually installed between the clutch 50 and the rotating shaft 12*a* of the engine 12.

Figure 16A:
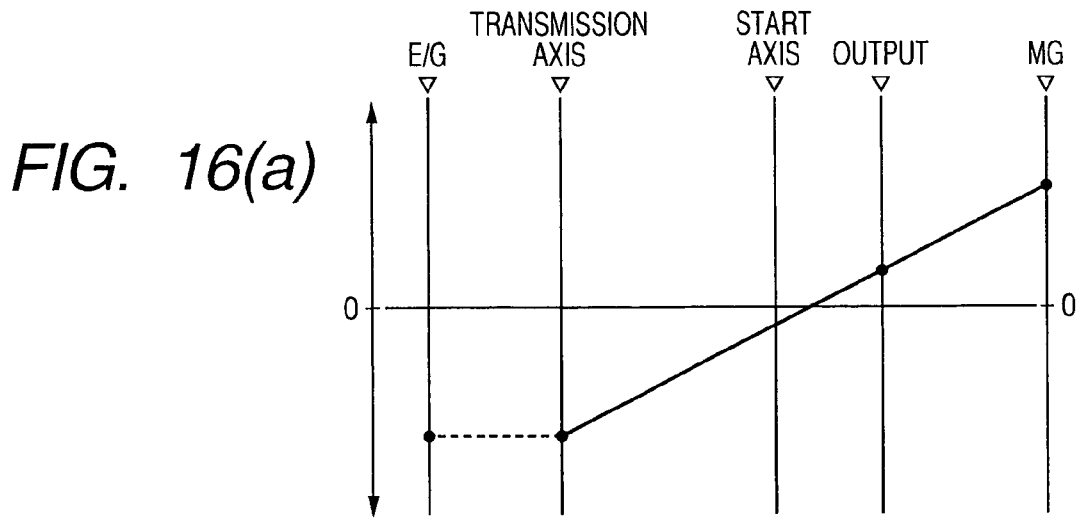
FIGS. 16(a), 16(b), and 16(c) are monographic charts which represent operations of the power split device along with the speed of an internal combustion engine in each of the modifications of FIGS. 15(a) and 15(b)
Figure 16B:
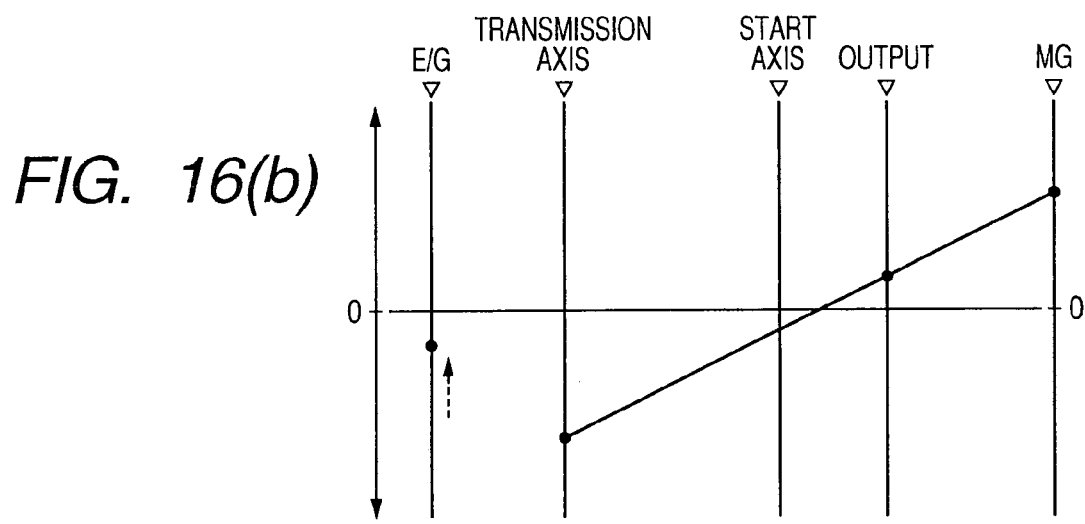
Figure 16C:
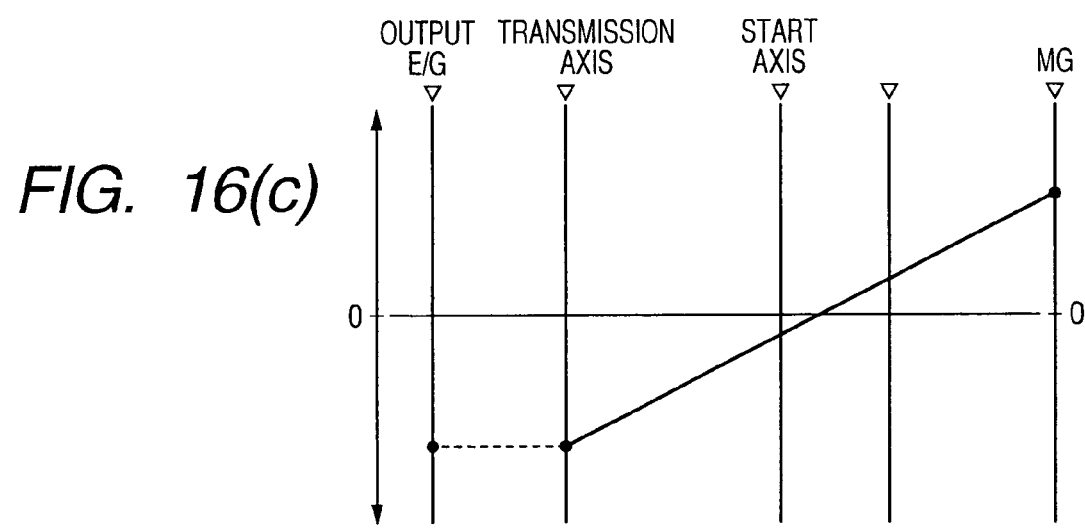

The switching between the rotors of the power split device 20 to be connected mechanically to the driven wheels 14 in the structure of FIG. 15(*a*) is achieved, like in the structure of the second embodiment of FIG. 5, by disconnecting the power split device 14 from the driven wheels 14 temporarily. In contrast, the structure of FIG. 15(*b*) has the advantage that the power may continue to be given to the driven wheels 14 while the rotors of the power split device 20 are being switched. FIGS. 16(*a*) to 16(*c*) demonstrate a sequence of switching operation, as performed by the controller 40 (see FIG. 1), i.e., how to switch the connection of the ring gear R of the first planetary gear set 22 and the carrier C of the second planetary gear set 24 to the driven wheels 14 to the connection of the sun gears S of the first and second planetary gear sets 22 and 24 to the driven wheels 14 in the structure of FIG. 15(*a*). FIG. 16(*a*) shows that the ring gear R of the first planetary gear set 22 and the carrier C of the second planetary gear set 24 are coupled to the driven wheels 14, and the engine 12 is increased in speed to increase the amount of energy supplied from the engine 12 to the driven wheels 14. When it has been required to supply an additional amount of energy to the driven wheels 14, however, a further increase in speed of the engine 12 will result in a decrease in efficiency in supplying the energy to the driven wheels 14, the controller 40 lowers, as illustrated in FIG. 16(*b*), the speed of the engine 12 toward the speed of the driven wheels 14. The speed of the driven wheels 14 is kept by the motor-generator 10. When the speed of the engine 12 reaches the speed of the driven wheels 14, the controller 40 controls the clutch 50 to establish the mechanical connection of the rotating shaft 12*a* of the engine 12 to the driven wheels 14 through the sun gears S. The speed of the engine 12 is, as illustrated in FIG. 16(*c*), coincident with that of the sun gears S of the first and second planetary gear sets 22 and 24, so that the engine 12 and the CVT 36 set two of the four different speeds in the monographic chart. In the case of the second planetary gear set 24, the speeds of the sun gear S and the ring gear R are set. In this mode, the motor-generator 10 needs not produce power and thus may be used as a generator.

The switching of the mechanical connection of the power split device 20 to the driven wheels 14 through clutch 50 in of FIG. 15(*a*) may be achieved in one of three following manners: (a) in which the sun gears S of the first and second planetary gear sets 22 and 24 are first connected to the driven wheels 14 through the clutch 50 to make two mechanical connections of the driven wheels 14 to (1) a combination of the ring gear R of the first planetary gear set 22 and the carrier C of the second planetary gear set 24 and to (2) a combination of the sun gears S of the first and second planetary gear sets 22 and 24, and the connection of the driven wheels 14 to (1) the combination of the ring gear R of the first planetary gear set 22 and the carrier C of the second planetary gear set 24 is opened by the clutch 50; (b) in which the clutch 50 is controlled to simultaneously switch the mechanical connection of the driven wheels 14 to (1) the combination of the ring gear R of the first planetary gear set 22 and the carrier C of the second planetary gear set 24 to (2) the combination of the sun gears S of the first and second planetary gear sets 22 and 24; and (c) in which the ring gear R of the first planetary gear set 22 and the carrier C of the second planetary gear set 24 are first disconnected from the driven wheels 14 through the clutch 50 to disengage the clutch 50 fully, and the mechanical connection of the driven wheels 14 to the combination of the sun gears S of the first and second planetary gear sets 22 and 24 is achieved by the clutch 50. The first manner (a) is most preferable in that the switching of the mechanical connections to the driven wheels 14 is achieved without any omission of transmission of torque to the driven wheels 14.

The structure of the hybrid system of FIG. 15(*a*) or 15(*b*) permits the vehicle to be towed in the event of an emergency. Specifically, the clutch 50 is disengaged to disconnect the driven wheels 14 from the power split device 20 fully, thereby allowing the driven wheels 14 to rotate freely. Alternatively, the clutch 38 is disengaged to disconnect the sun gear S from the ring gear R of the second planetary gear set 24, thereby allowing the driven wheels 14 to rotate freely.

The hybrid system of the second embodiment or the above modifications is designed to switch or change the rotors of the power split device 40 which are to be connected mechanically to the driven wheels 14, but however, may alternatively be designed to change the rotor of the power split device 40 which is to be connected mechanically to the motor-generator 10.

The first and second planetary gear sets 22 and 24 of the power split device 20 may alternatively be designed to have structures different from those described in the above embodiments as long as any two of the three rotors (i.e., the sun gear S, the carrier C, and the ring gear R) of the first planetary gear set 22 are coupled mechanically to any two of the three rotors (i.e., the sun gear S, the carrier C, and the ring gear R) of the second planetary gear set 24. FIGS. 17(*a*) to 17(*j*) and FIGS. 18(*a*) to 18(*j*) are monographic charts illustrating possible modifications of the first and second planetary gear sets 22 and 24. Each of the monographic charts represents a relation in connection between a total of six rotors of the first and second planetary gear sets 22 and 24 and a relation between four different speeds arraying straight in the monographic chart and the six rotors of the first and second planetary gear sets 22 and 24. Note that the ratio of the number of teeth of the run gear S to that of the ring gear R is, however, indicated schematically for the sake of convenience.

Figure 19A:
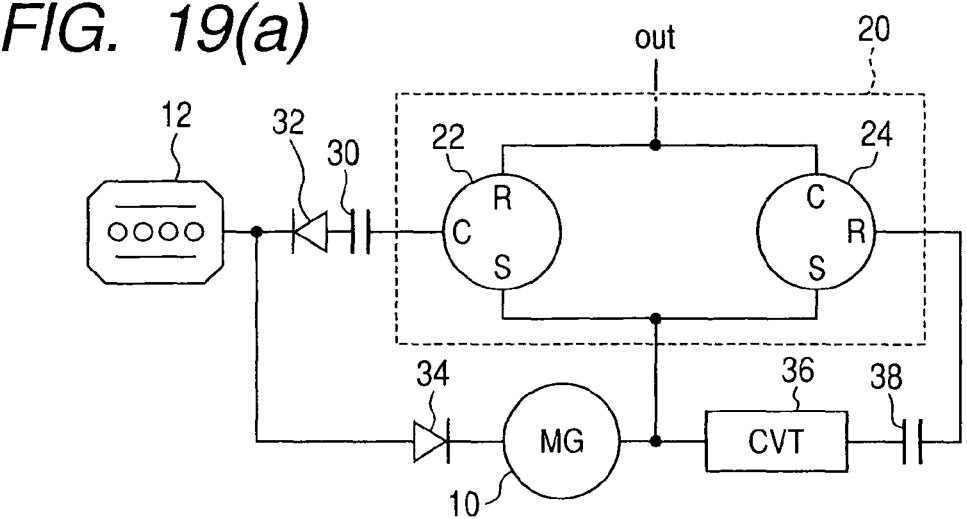
FIGS. 19(a), 19(b), and 19(c) are block diagrams which illustrate modifications of the power transmission device of the first embodiment.
Figure 19B:
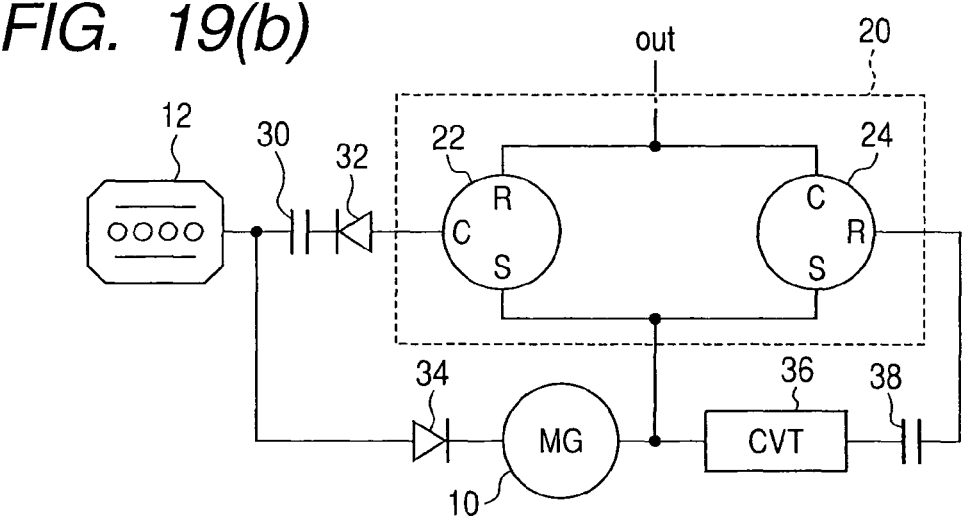
Figure 19C:
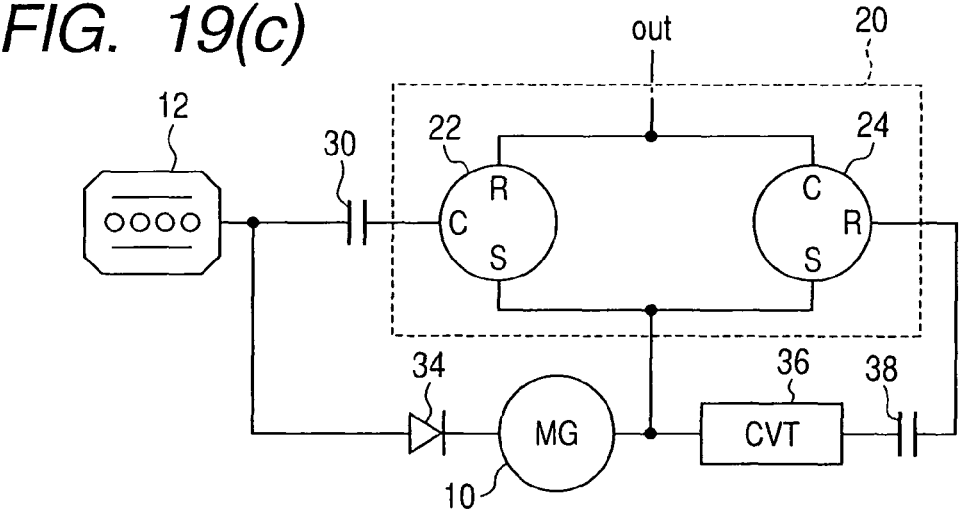
Figure 20B:
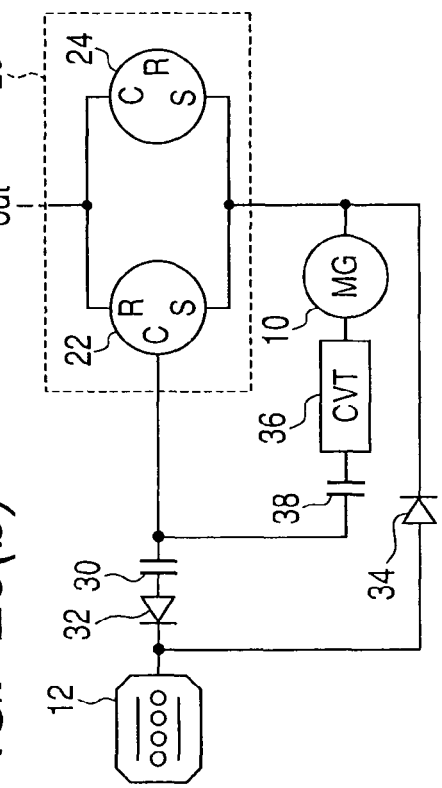
FIGS. 20(a), 20(b), 20(c), and 20(d) are block diagrams which illustrate modifications of the power transmission device of the first embodiment.
Figure 20D:
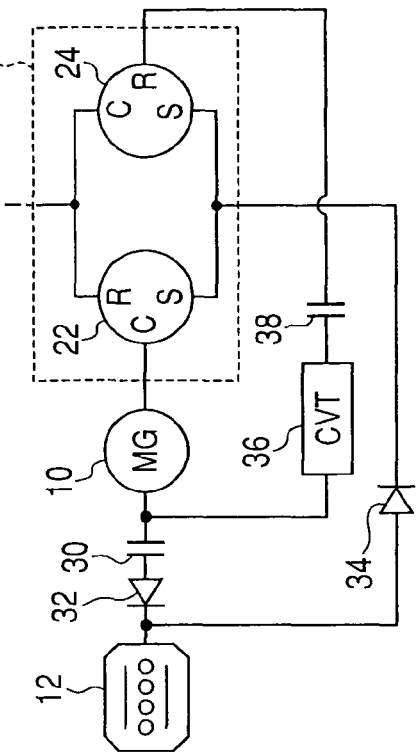
Figure 20A:
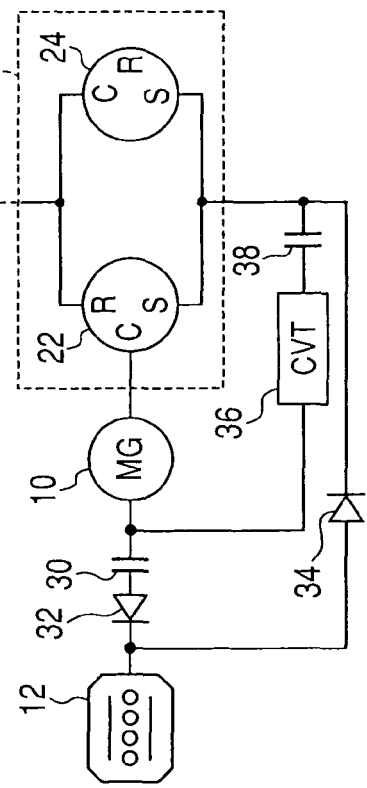
Figure 20C:
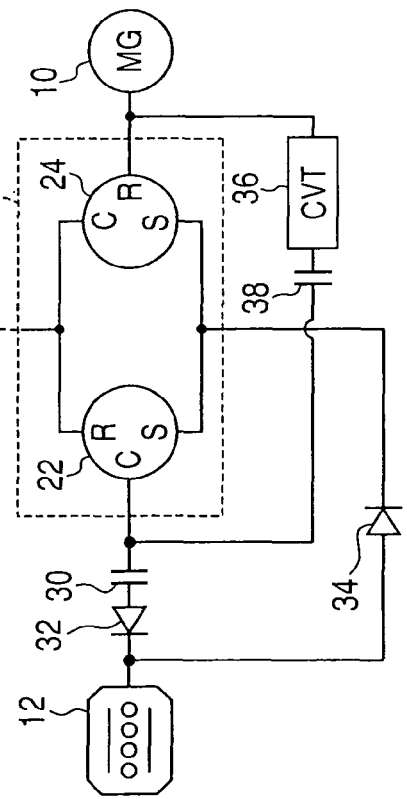
Figure 21A:
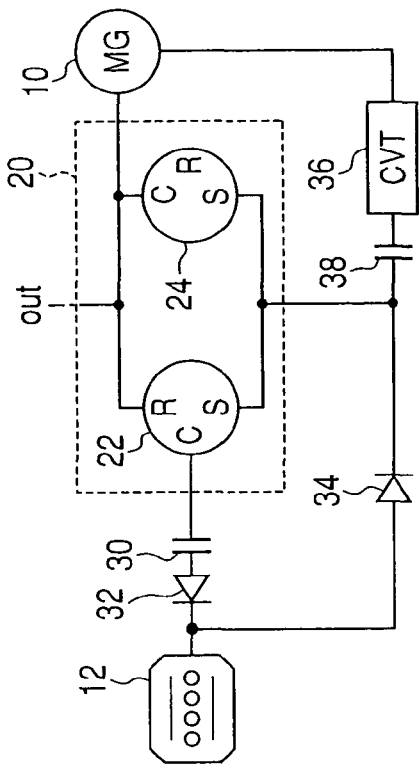
FIGS. 21(a), 21(b), 21(c), and 21(d) are block diagrams which illustrate modifications of the power transmission device of the first embodiment.
Figure 21B:
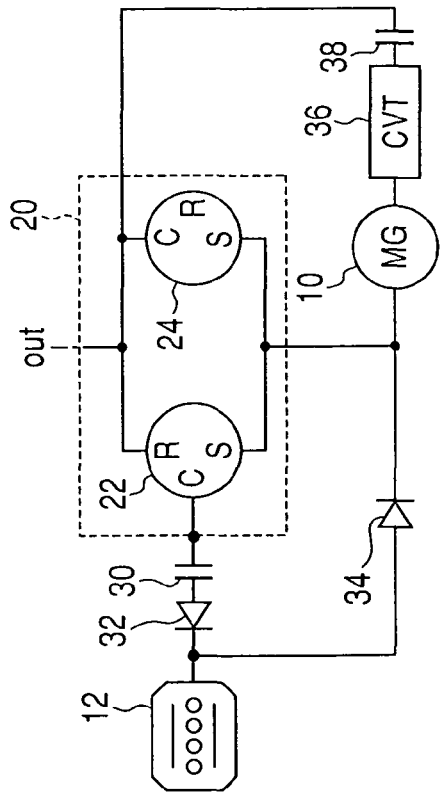
Figure 21C:
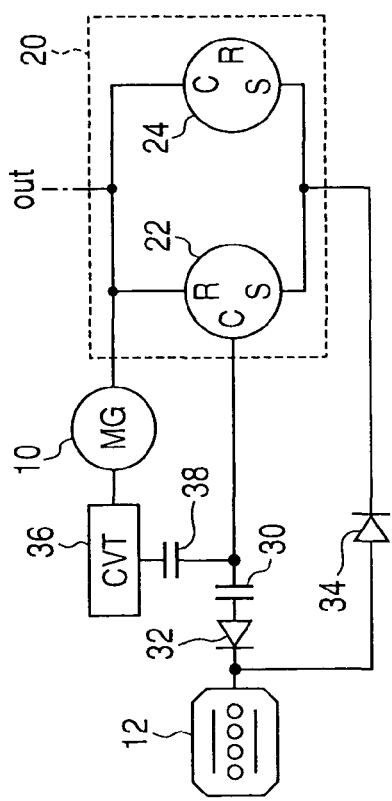
Figure 21D:
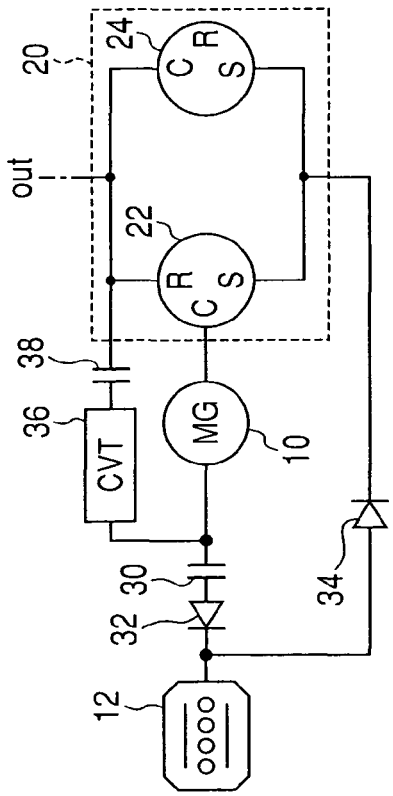
Figure 22A:
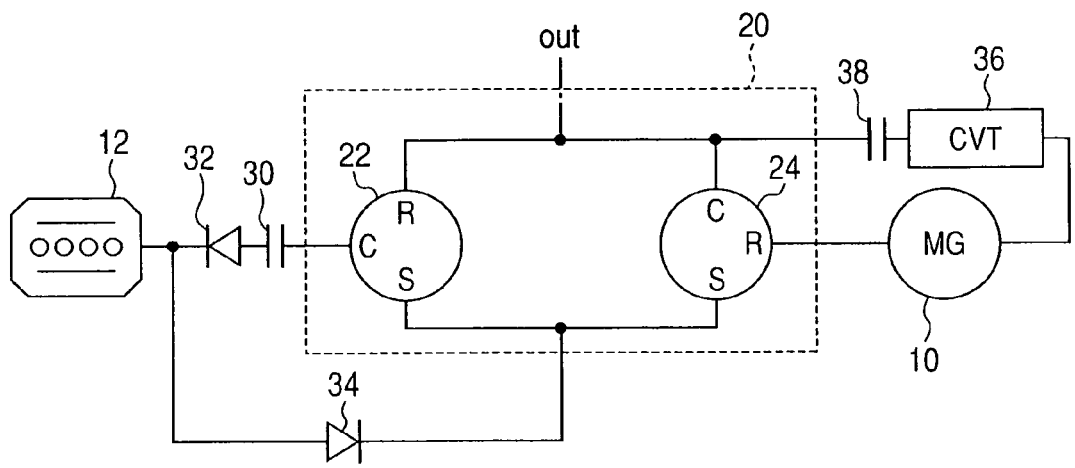
FIGS. 22(a) and 22(b) are block diagrams which illustrate modifications of the power transmission device of the first embodiment.
Figure 22B:
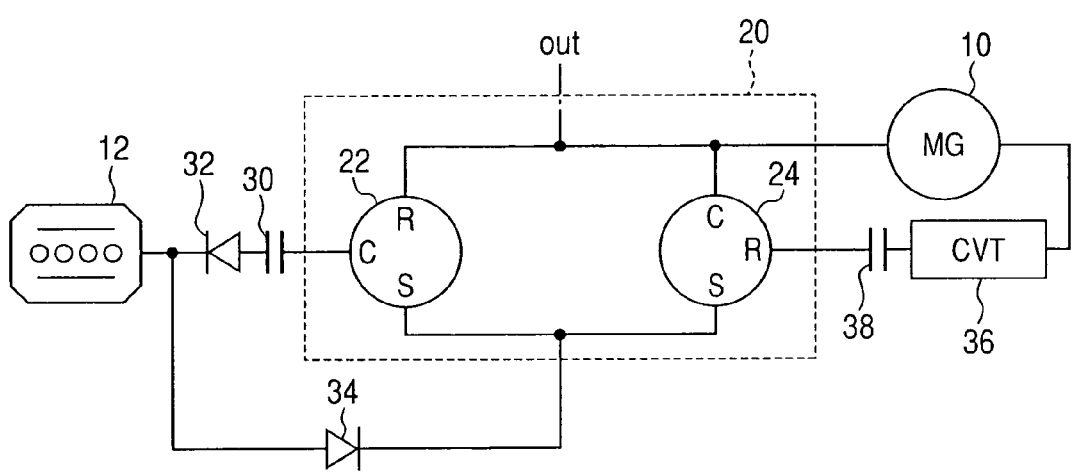

In each of the monographic charts, the sun gear S, the carrier C, and the ring gear R of the first planetary gear set 22 are illustrated on the upper side. For example, in FIGS. 17(*b*) and 17(*c*), the ring gears R of the first and second planetary gear sets 22 and 24 are connected mechanically to each other. The carriers C of the first and second planetary gear sets 22 and 14 are connected mechanically to each other. Which of the ratio of the number of teeth of the run gear S to that of the ring gear R of the first planetary gear set 22 and that of the second planetary gear set 24 is greater is represented by lateral locations of vertical lines indicating the sun gears S. The same advantages, as described in the first embodiment, may be obtained by connecting the motor-generator 10 to the rotor of the power split device 20 which lies in speed at the right or left end in the monographic chart, and connecting the rotors having intermediate speeds to the starting axis for the engine 12 and the driven wheels 14, respectively from the left in the monographic chart. The rotor to which the motor-generator 10 is connected mechanically without the CVT 36 is not limited to the rotor lying in speed at the right end in the monographic chart, but may be the rotor lying at the left end in the monographic chart. FIGS. 19(*a*), 19(*b*), and 19(*c*) illustrate modifications of the first embodiment in which the motor-generator 10 is connected mechanically to the rotors of the power split device 20 without the CVT 36 which lie in speed at the left end in the monographic chart. The examples of FIGS. 19(a) and 19(b) are opposite in location of the one-way bearing 32 and the clutch 30. The example of FIG. 19(c) omits the one-way bearing 32. The rotors connected to the starting axis for the engine 12 and the driven wheels 14 need not always have intermediate speeds in the monographic chart. When there are the rotors of the power split device 20 other than the rotor coupled mechanically to the starting axis are different in sign of output rotational energy thereof, the speed of the starting axis may be placed at an extremely low value or exactly zero (0). This ensures the addition of the initial torque to the engine 12. When there are the rotors of the power split device 20 other than the rotors coupled mechanically to the driven wheels 14 are different in sign of output rotational energy, the speed of the driven wheels 14 may be placed at a positive value, a negative value, or zero (0) while the rotation of the motor-generator 10 is kept in one of opposed directions.

The power split device 20 may alternatively be designed to have a single planetary gear set, that is, either of the first and second planetary gear sets 22 and 24. For instance, the power split device 20 may be equipped with a single planetary gear set and two motor-generators: first and second motor-generators. The first motor-generator is connected mechanically to the sun gear of the planetary gear set. The second motor-generator is connected mechanically to the ring gear of the planetary gear set. The carrier of the planetary gear set is connected mechanically to the starting axis of the power split device 20. The power transmission axis is connected to the ring gear of the planetary gear set. This enables the engine 12 to be started. The power split device 10 may also be designed to have the structure, as taught in the first to third publications already referred to in the introductory part of this application, instead of the planetary gear set equipped with the sun gear, the carrier, and the ring gear. The same advantage (6), as described in the first embodiment, may be obtained by selecting the rotors of the power split device 20 which are to be connected to the starting axis and the power transmission axis so that the speed of the starting axis may be lower than or equal to that of the power transmission axis. The power split device 20 may be so designed that the speed of the rotor connecting with the starting axis depends upon that of the rotor connecting with the motor-generator 10. This structure ensures the accuracy in controlling the speed of the rotor connecting with the starting axis, i.e., starting of the engine 12. The power split device 20 may be so designed that the speed of the rotors connecting with the driven wheels 14 depends upon those of the rotors connecting with the motor-generator 10 and the engine 12. This structure ensures the accuracy in controlling the speed of the rotors connecting with the driven wheels 14.

In the above examples, the motor-generator 10 needs not always be connected mechanically to the rotors of the power split device 20 which lie in speed at the right and left ends in the monographic chart. For instance, the motor-generator 10 may be connected mechanically to the rotors of the power split device 20 other than those lying in speed at the right or left end in the monographic chart. In the case where such a connection sets the speed of the rotor(s) lying at either of the right or left ends in the monographic chart, that rotor(s) may be joined to the power transmission axis. FIGS. 20(a) to 22(b) illustrate modifications of the power split device 20 which are different from the one of the first embodiment in mechanical connection with the motor-generator 10 and/or the CVT 36. Such modifications may be used with the hybrid system in the second to fifth embodiments or in FIGS. 17(a) to 18(j). It is, however, advisable that the rotor(s) of the power split device 20 connecting mechanically with the motor-generator 10 or the CVT 36 be, as illustrated in FIGS. 20(a) to 20(d), different from those connecting mechanically with the driven wheels 14, which enables the speed of the motor-generator 10 to be adjusted to a value other than zero (0) when the speed of the driven wheels 14 is zero (0). Therefore, when the speed of the driven wheels 14 is zero (0), the engine 12 may be started to run the vehicle. Additionally, when the driven wheels 14 are at a stop, the motor-generator 10 may be used to drive an accessory installed in the vehicle such as a compressor of an in-vehicle air conditioner or a brake pump.

The power split device 20 may also be designed to have the rotor(s) which lies in rotational speed at either of the right or left end in the monographic chart and is connected mechanically to the driven wheels 14. The installation of a gear change mechanism such as a speed variator between that rotor(s) and the driven wheels 14 results in increased accuracy in controlling the speed of the driven wheels 14.

The power split rotors of the power split device 20, as already described above, need not include only the rotors of the planetary gear set(s), but may be implemented only by or additionally include rotating parts of the differential gear and/or the drive shaft of the automotive vehicle. The power split device 20 may also be designed to have three or more rotors which are out of the straight line in speed in the monographic chart. For example, the power spilt device 20 may be made of a typical gear box with clutches.

The power split device 20 of the first to fifth embodiment has the rotors which lie in speed at the right and left ends in the monographic chart and either of which is connected to the motor-generator 10 through the CVT 36, but however, both these rotors may alternatively be coupled to the CVT 36.

The mechanical connections of the driven wheels 14, the engine 12, the motor-generator 10 to the power split device 20 may alternatively be achieved in some way different from those as described above. For instance, a speed reducer such as a speed reduction gear set or a counter gear may be disposed between the power spilt device 20 and the driven wheels 14. The selection of the counter gear depending upon specifications of the engine 12 such as the direction of rotation thereof will ensure the desired distribution of power to the driven wheels 14. The mechanical connection of the driven wheels 14 to the power split device 20 may also be achieved using a chain or a belt instead of a rigid gear mechanism.

Similarly, a counter gear may also be disposed between the engine 12 and the power transmission axis or the starting axis of eth power split device 20. It is preferable to select the counter gear depending upon the specifications of the engine 12. The mechanical connection of the engine 12 and the power split device 20 may also be achieved using a chain or a belt instead of a rigid gear mechanism. A gear change mechanism such as a speed variator may also be disposed between the power spilt device 20 and the engine 12. In this case, the same advantages as those in the above embodiments may be obtained by connecting the rotors of the power split device 20 which are coupled to the power transmission axis to the rotating shaft 12a of the engine 12 through the gear change mechanism. This also enables the speed of the rotating shaft 12a to differ from that of the speed of the power transmission axis. Additionally, a speed increasing mechanism such as a speed increasing gear set or a speed reducer such as a speed reduction gear set may also be disposed between the engine 12 and the power split device 20.

A speed increasing mechanism such as a speed increasing gear set or a speed reducer such as a speed reduction gear set may also be disposed in a mechanical connection between the motor-generator 10 and the power split device 20 without the CVT 36. The hybrid system of the first embodiment, as clearly illustrated in FIG. 1(*b*), has the motor-generator 10 mechanically connected to the ring gear of the second planetary gear set 24 through the counter gear CN. Similarly, a rotary reversing mechanism such as a counter gear may also be disposed between the CVT 36 and the sun gears S of the first and second planetary gear sets 22 and 24. This is achieved under the condition that the speed of the carrier C can be zero (0) when the speeds of the sun gear S and the ring gear R are opposite in sign to each other, however, may also be achieved under the condition that the speed of the carrier C can be zero (0) when the speeds of the sun gear S and the ring gear R are the same in sign. For example, it may be realized by using a so-called double planetary gear set, as taught in Japanese Patent First Publication No. 2001-108073. The mechanical connection of the motor-generator 10 to the power split device 20 without the CVT 36 may also be achieved using a chain or a belt as well as a rigid gear mechanism.

In the first to fifth embodiments, the CVT 36 disposed between the motor-generator 10 and the rotors of the power split device 20 which lie at one of ends in the monographic chart defining the speeds of the rotors of the power split device 20 needs not be of a belt-type. For example, a traction drive type or hydraulic continuously variable transmission may be used. Alternatively, a gear transmission may be used instead of the CVT 36. The same applies to the CVT 36 installed between the motor-generator 10 and the rotor of the power split device 20 which is at the intermediate location of the monographic chart in the structures, as illustrated in FIGS. 20(*a*) to 22(*b*).

The rotors of the power split device 20 to which the motor-generator 10 and the CVT 36 are to be connected mechanically need not be objects which are arrayed in speed on the straight line in the monographic chart. The rotors of the power split device 20 referred to herein are, as described above, not limited to the rotors of the first and second planetary gear sets 22 and 24, but may additionally or only include rotating parts of the differential gear and/or the drive shaft of the automotive vehicle. For instance, in the case where the power split device 20 is equipped with two planetary gear sets which are coupled, as like in FIG. 20(*c*) or 20(*d*), through the CVT 36, one of three rotors of one of the two planetary gear sets is connected mechanically (directly) to one of three rotors of the other planetary gear set so that two straight lines each of which extends through vertical axes of the monographic chart indicating the rotational speeds of the three rotors of one of the planetary gear sets may intersect at a single point in the monographic chart. The rotor on one of the two lines and the rotor on the other line may be selected as the objects to which the motor-generator 10 and the CVT 36 are to be connected mechanically.

Figure 23A:
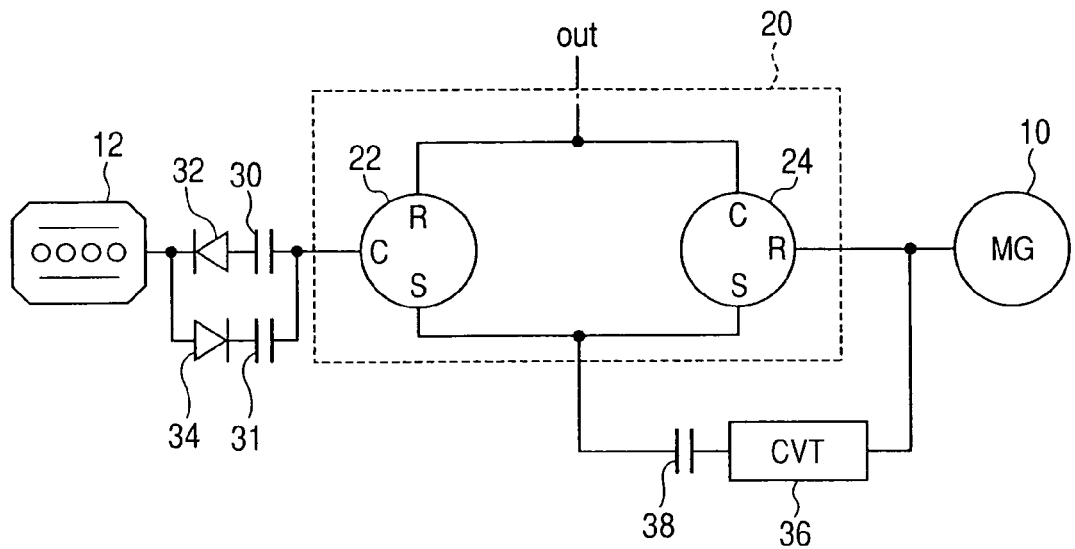
FIGS. 23(a) and 23(b) are block diagrams which illustrate modifications of the power transmission device of the first embodiment.
Figure 23B:
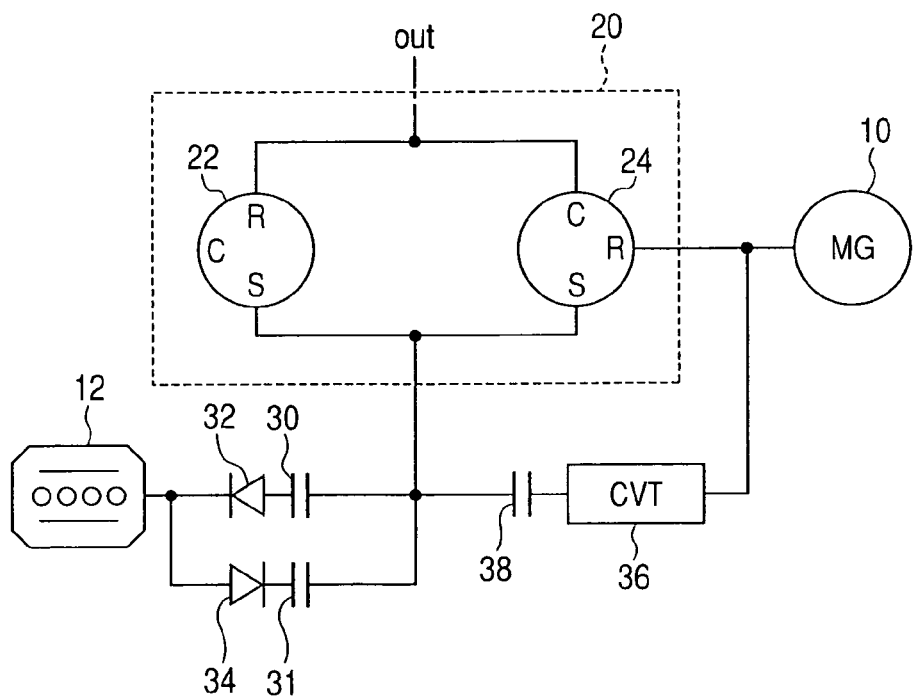

In each of the above embodiments, the starting axis is separate from the power transmission axis, but a single axis may alternatively be used as working as the starting and power transmission axes, as illustrated in FIGS. 23(*a*) and 23(*b*). The example of FIG. 23(*a*) is a modification of the first embodiment. The carrier C of the first planetary gear set 22 is used as both a first rotor to provide the initial torque to start the engine 12 and a second rotor to which the power, as produced by the engine 12, is added. The feature of this structure is that the carrier C of the first planetary gear set 22 is connected to the engine 12 through a first power transmission path equipped with the clutch 30 and the one-way bearing 32 and a second power transmission path equipped with the one-way bearing 34 and the clutch 31. This ensures the starting of the engine 12 and supply of power from the engine 12 to the power split device 20 through only one (i.e., the carrier C) of the rotors of the first planetary gear set 22. Specifically, when it is required to start the engine 12, the controller 40 disengages the clutch 31 and engages the clutch 30 to transmit the torque of the carrier C of the first planetary gear set 22 to the rotating shaft 12*a* of the engine 12. After the engine 12 is started up, the controller 40 engages the clutch 31 to transmit the torque of the engine 12 to the carrier C of the first planetary gear set 22.

Similarly, the example of FIG. 23(*b*) is a modification of the first embodiment. The sun gears S of the first and second planetary gear sets 22 and 14 is used as the rotors of the power split device 20 to provide the initial torque to start the engine 12 and to which the power, as produced by the engine 12, is added. The feature of this structure is, like in FIG. 12(*a*), that the sun gears S the first and second planetary gear sets 22 and 24 are connected to the engine 12 through the first power transmission path equipped with the clutch 30 and the one-way bearing 32 and the second power transmission path equipped with the one-way bearing 34 and the clutch 31. The first power transmission path in FIG. 23(*a*) or 23(*b*) may alternatively be equipped with only the one-way bearing 32. Similarly the second transmission path may alternatively be equipped with only the clutch 31.

The same structure as illustrated in FIG. 23(*a*) or 23(*b*) may be used in each of the other embodiments or FIGS. 17(*a*) to 18(*j*).

The above structure in which the engine 12 and the power split device 20 are connected through the single power transmission path may be modified as illustrated in FIGS. 24(*a*) and 24(*b*). In the example of each of FIGS. 24(*a*) and 24(*b*), the power transmission path has installed therein the clutch 30 which works to establish or block the transmission of power to or from the engine 12 as needed. The example of FIG. 24(*a*) is so designed that the speed of the rotor of the power split device 20 which connects mechanically with the rotating shaft 12*a* of the engine 12 can be zero (0) when the speed of the driven wheels 14 is not zero (0). This ensures better starting of the engine 12.

FIGS. 25(*a*) to 25(*c*) demonstrate an operation of the hybrid system of FIG. 24(*a*) to start the engine 12. FIG. 25(*a*) represents the speed of the carrier C of the first planetary gear set 22. FIG. 25(*b*) represents the status of the clutch 30. FIG. 25(*c*) represents the speed of the engine 12. When the speed of the carrier C of the first planetary gear set 22 is, as shown in FIG. 25(*a*), zero (0), the controller 40 engages the clutch 30 to provide the initial torque to the rotating shaft 12*a* to start or crank the engine 12. Afterwards, the controller 40 disengages the clutch 30 to open the mechanical connection between the engine 12 and the carrier C and starts the burning of fuel in the engine 12. When the speed of the engine 12 becomes equal to that of the carrier C, the controller 40 engages the clutch 30 to establish the mechanical connection between the engine 12 and the carrier C. The engagement of the clutch 30 needs not always be established only when the speed of the engine 12 is exactly identical with that of the carrier C. Such engagement may be achieved when a difference in speed between the engine 12 and the carrier C lies within a given range near zero (0). The use of such a condition enables the hybrid system of FIG. 24(*b*) to start the engine 12 during running of the motor-generator 10.

The hybrid system of each of the above embodiments is equipped with a single or two rotary electric machines which are also called a dynamo-electric machine (i.e., the motor-generator 10 or the motor-generators 10A and 10B), but may alternatively be equipped with three or more rotary electric machines. These machines need not be designed as a motor-generator. For example, one or some of the rotary electric machines may be used as only the electric motor or the electric generator.

The rotary electric machines may be implemented by a three-phase AC motor or a DC motor with brushes, or an induction motor.

The hybrid system of each of the embodiments may alternatively be designed to have two or more internal combustion engines.

The in-vehicle power transmission device and the driving system may alternatively be used with a vehicle equipped with a single driven wheel such as a motorcycle.

The power transmission device, as discussed in each of the above embodiments and modifications, may be equipped with a four-axis power split device instead of the first and second planetary gear sets 22 and 24. For instance, a Ravineaux planetary gear set may be used which is equipped substantially with the four power split rotors: the sun gear, the sun gear, the carrier, and the ring gear which define four rotary axes. The four rotary axes are coupled mechanically to the motor-generator 10, the driven wheels 14, the engine 12, and the motor-generator 10 through the CVT 36, respectively.

The driving system of the invention, as described above, is equipped with the power transmission device, as discussed in the above embodiments and modifications and the controller 40, as illustrated in FIG. 1(*a*). For instance, the driving system may be designed to have the structure of FIG. 1(*a*). In this case, when the speed of the internal combustion engine 12 is lower than a predetermined value, and it is required to restart the engine 12, the controller 40 may engage the clutch 30 to transmit the torque (i.e., the rotational energy which is positive in sign, as defined in FIG. 2(*c*)) from the carrier C of the first planetary gear set 22 to the rotating shaft 12*a* of the engine 12. The predetermined value is, for example, a lower limit of the speed of the engine 12 at which the vehicle is running, and the engine 12 is enabled to be restarted or fired up without need for adding the torque to the rotating shaft 12*a* externally. In other words, when it is required to restart the engine 12, but the speed of the engine 12 is too low to restart it without the addition of torque to the rotating shaft 12*a*, the controller 40 engages the clutch 30 to transmit the torque from the power split device 20 to the rotating shaft 12*a* of the engine 12. This structure eliminates the need for an engine starter to restart the engine 12.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A power transmission apparatus for a vehicle comprising:
a plurality of power split rotors, including at least a first rotor, a second rotor, and a third rotor, which work to rotate in conjunction with each other to split power among a rotary electric machine, an internal combustion engine, and a driven wheel of a vehicle;
a power transmission control mechanism working to selectively establish and block transmission of the power between a first rotor that is one of the power split rotors and the internal combustion engine; and
a second power transmission control mechanism disposed between the internal combustion engine and the second rotor; wherein
the third rotor is connected to the driven wheel of the vehicle;
the second rotor is mechanically connected to the third rotor;
at the time the internal combustion engine is started,
the first power transmission control mechanism permits power to be transmitted therethrough,
the second power transmission control mechanism prevents power from being transmitted therethrough,
power produced by the rotary electric machine is inputted to the second rotor,
the torque of the first rotor is inputted to the internal combustion engine, and
the rotational energy of the second rotor is different in sign from the rotational energy of the third rotor;
after the internal combustion engine has started,
the first power transmission control mechanism prevents power from being transmitted therethrough,
the second power transmission control mechanism permits power to be transmitted therethrough, and
the torque produced by the internal combustion engine is inputted to the second rotor; and
if rotational energy, as outputted from said power split rotors, is defined as being positive in sign, the power split rotors are so disposed that when said power transmission control mechanism establishes transmission of the rotational energy that is positive in sign as the power from the first rotor to the internal combustion engine, ones of said power split rotors other than the first rotor are so linked as to provide output rotational energies which are different in sign from each other.

2. A power transmission apparatus as set forth in claim 1, wherein the ones of said power split rotors which produce the rotational energies different in sign from each other are coupled mechanically with each other through a path bypassing an assembly of said power split rotors.

3. A power transmission apparatus as set forth in claim 2, further comprising a coupling mechanism which couples two of the rotors together mechanically outside the assembly of said power split rotors, and wherein said coupling mechanism works as a speed variator having a variable gear ratio.

4. A power transmission apparatus as set forth in claim 1, wherein the power transmission control mechanism works as a first power transmission control mechanism to selectively establish and block transmission of the power between the first rotor and a rotating shaft of the internal combustion engine, and further comprising a second power transmission control mechanism working to selectively establish and block transmission of the power between a second rotor that is one of the power split rotors and the internal combustion engine.

5. A power transmission apparatus as set forth in claim 4, wherein the first power transmission control mechanism is equipped with a one-way power transmission mechanism which establishes the transmission of the power when rotational speed of an input side of the one-way power transmission mechanism which connects with the first rotor relative to that of an output side thereof which connects with the rotating shaft of the internal combustion engine is not a negative value.

6. A power transmission apparatus as set forth in claim 5, wherein the first power transmission control mechanism is also equipped with an electronically controlled breaker which is separate from the one-way power transmission mechanism, the electronically controlled breaker working to block the transmission of power between the first rotor and the rotating shaft of the internal combustion engine.

7. A power transmission apparatus as set forth in claim 4, wherein the second power transmission control mechanism is equipped with a one-way power transmission mechanism which establishes the transmission of the power when rotational speed of an input side of the one-way power transmission mechanism which connects with the rotating shaft of the internal combustion engine relative to that of an output side thereof which connects with the second rotor is not a negative value.

8. A power transmission apparatus as set forth in claim 4, wherein one of said power split rotors is coupled mechanically to the rotary electric machine, and wherein said power split rotors are so linked that rotational speed of the first rotor depends directly upon rotational speed of the one of said power split rotors coupled to the rotary electric machine.

9. A power transmission apparatus as set forth in claim 4, wherein one of said power split rotors is coupled mechanically to the rotary electric machine, and wherein said power split rotors are so linked that rotational speeds of ones of said power split rotors other than the one coupled to the rotary electric machine depend directly upon rotational speed of the one coupled to the rotary electric machine and rotational speed of the second rotor.

10. A power transmission apparatus as set forth in claim 4, wherein the first rotor and the second rotor are implemented by one of said power split rotors, and wherein the first power transmission control mechanism is separate from the second power transmission control mechanism.

11. A power transmission apparatus as set forth in claim 4, wherein the first rotor and the second rotor are implemented by one of said power split rotors, and wherein the first power transmission control mechanism and the second power transmission control mechanism are implemented by an electronically controlled breaker working to break the transmission of power between the first rotor and the rotating shaft of the internal combustion engine.

12. A power transmission apparatus as set forth in claim 4, wherein the first rotor is separate from the second rotor.

13. A power transmission apparatus as set forth in claim 12, wherein said power split rotors are so linked that rotational speed of the first rotor is lower than that of the second rotor.

14. A power transmission apparatus as set forth in claim 1, wherein at least one of the two of the three or more rotors is coupled to the rotary electric machine through a speed variator having a variable gear ratio.

15. A power transmission apparatus as set forth in claim 1, further comprising a first planetary gear set and a second planetary gear set each of which is equipped with a sun gear, a carrier, and a ring gear that are three of said power split rotors, two of said power split rotors of the first planetary gear set being coupled mechanically to two of said power split rotors of the second planetary gear set, and wherein of four of a total of the six power split rotors of the first and second planetary gear sets, at least three are coupled mechanically to the rotary electric machine, the internal combustion engine, and the driven wheel, respectively.

16. A power transmission apparatus as set forth in claim 4, further comprising a switch working to switch one of said power split rotors coupled mechanically to the driven wheel to another.

17. A power transmission apparatus as set forth in claim 16, wherein the vehicle further has a wheel, further comprising a switch working to switch ones of said power split rotors coupled mechanically to the driven wheels to others, and wherein the ones and the others of said power split rotors to be coupled to the driven wheels include the second rotor and one of said power split rotors other than the first rotor, and wherein the second rotor is coupled mechanically to the driven wheels through the second power transmission control mechanism.

18. A driving system for a vehicle comprising:
a power transmission apparatus including,
(A) a plurality of power split rotors, including at least a first rotor, a second rotor, and a third rotor, which work to rotate in conjunction with each other to split power among said rotary electric machine, an internal combustion engine installed in a vehicle, and a driven wheel of the vehicle,
(B) a power transmission control mechanism which works to selectively establish and block transmission of the power between a first rotor that is one of the power split rotors and the internal combustion engine,
(C) a second power transmission control mechanism disposed between the internal combustion engine and the second rotor; and
(D) a controller working to control an operation of said power transmission apparatus, when it is required to start the internal combustion engine, and rotational speed of the internal combustion engine is lower than a given value, said controller controlling the power transmission control mechanism to establish the transmission of the rotational energy which is positive in sign from the first rotor to the internal combustion engine,
wherein
(1) the third rotor is connected to the driven wheel of the vehicle;
(2) the second rotor is mechanically connected to the third rotor;
(3) at the time the internal combustion engine is started.
  (a) the first power transmission control mechanism permits power to be transmitted therethrough,
  (b) the second power transmission control mechanism prevents power from being transmitted therethrough,
  (c) power produced by the rotary electric machine is inputted to the second rotor,
  (d) the torque of the first rotor is inputted to the internal combustion engine, and
  (e) the rotational energy of the second rotor is different in sign from the rotational energy of the third rotor;
(4) after the internal combustion engine has started,
  (a) the first power transmission control mechanism prevents power from being transmitted therethrough,
  (b) the second power transmission control mechanism permits power to be transmitted therethrough, and
  (c) the torque produced by the internal combustion engine is inputted to the second rotor; and
(5) if rotational energy, as outputted from said power split rotors, is defined as being positive in sign, the power split rotors are so disposed that when the power transmission control mechanism establishes transmission of the rotational energy that is positive in sign as the power from the first rotor to the internal combustion engine, ones of said power split rotors other than the first rotor are so linked as to provide output rotational energies which are opposite in sign to each other.

19. A driving system as set forth in claim 18, wherein the ones of said power split rotors which produce the rotational energies different in sign from each other are coupled mechanically with each other through a path bypassing an assembly of said power split rotors.

20. A driving system as set forth in claim 19, further comprising a coupling mechanism which couples two of the rotors together mechanically outside the assembly of said power split rotors, and wherein said coupling mechanism works as a speed variator having a variable gear ratio.

21. A driving system as set forth in claim 18, wherein the power transmission control mechanism works as a first power transmission control mechanism to selectively establish and block transmission of the power between the first rotor and a rotating shaft of the internal combustion engine, and further comprising a second power transmission control mechanism working to selectively establish and block transmission of the power between a second rotor that is one of the power split rotors and the internal combustion engine.

22. A driving system as set forth in claim 21, wherein the first power transmission control mechanism is equipped with a one-way power transmission mechanism which establishes the transmission of the power when rotational speed of an input side of the one-way power transmission mechanism which connects with the first rotor relative to that of an output side thereof which connects with the rotating shaft of the internal combustion engine is not a negative value.

23. A driving system as set forth in claim 22, wherein the first power transmission control mechanism is also equipped with an electronically controlled breaker which is separate from the one-way power transmission mechanism, the electronically controlled breaker working to block the transmission of power between the first rotor and the rotating shaft of the internal combustion engine.

24. A driving system as set forth in claim 21, wherein the second power transmission control mechanism is equipped with a one-way power transmission mechanism which establishes the transmission of the power when rotational speed of an input side of the one-way power transmission mechanism which connects with the rotating shaft of the internal combustion engine relative to that of an output side thereof which connects with the second rotor is not a negative value.

25. A driving system as set forth in claim 21, wherein one of said power split rotors is coupled mechanically to the rotary electric machine, and wherein said power split rotors are so linked that rotational speed of the first rotor depends directly upon rotational speed of the one of said power split rotors coupled to the rotary electric machine.

26. A driving system as set forth in claim 21, wherein one of said power split rotors is coupled mechanically to the rotary electric machine, and wherein said power split rotors are so linked that rotational speeds of ones of said power split rotors other than the one coupled to the rotary electric machine depend directly upon rotational speed of the one coupled to the rotary electric machine and rotational speed of the second rotor.

27. A driving system as set forth in claim 21, wherein the first rotor and the second rotor are implemented by one of said power split rotors, and wherein the first power transmission control mechanism is separate from the second power transmission control mechanism.

28. A driving system as set forth in claim 21, wherein the first rotor and the second rotor are implemented by one of said power split rotors, and wherein the first power transmission control mechanism and the second power transmission control mechanism are implemented by an electronically controlled breaker working to break the transmission of power between the first rotor and the rotating shaft of the internal combustion engine.

29. A driving system as set forth in claim 21, wherein the first rotor is separate from the second rotor.

30. A driving system as set forth in claim 29, wherein said power split rotors are so linked that rotational speed of the first rotor is lower than that of the second rotor.

31. A driving system as set forth in claim 18, wherein at least one of the two of the three or more rotors is coupled to the rotary electric machine through a speed variator having a variable gear ratio.

32. A driving system as set forth in claim 18, further comprising a first planetary gear set and a second planetary gear set each of which is equipped with a sun gear, a carrier, and a ring gear that are three of said power split rotors, two of said power split rotors of the first planetary gear set being coupled mechanically to two of said power split rotors of the second planetary gear set, and wherein of four of a total of the six power split rotors of the first and second planetary gears, at least three are coupled mechanically to the rotary electric machine, the internal combustion engine, and the driven wheel, respectively.

33. A driving system as set forth in claim 21, further comprising a switch working to switch one of said power split rotors coupled mechanically to the driven wheel to another.

34. A driving system as set forth in claim 33, wherein the vehicle further has a wheel, further comprising a switch working to switch ones of said power split rotors coupled mechanically to the driven wheels to others, and wherein the ones and the others of said power split rotors to be coupled to the driven wheels include the second rotor and one of said power split rotors other than the first rotor, and wherein the second rotor is coupled mechanically to the driven wheels through the second power transmission control mechanism.

* * * * *